US008755932B2

(12) United States Patent
Peters et al.

(10) Patent No.: US 8,755,932 B2
(45) Date of Patent: Jun. 17, 2014

(54) SYSTEMS AND METHODS FOR FACILITATING CONSUMER-DISPENSER INTERACTIONS

(75) Inventors: Dan Peters, Alpharetta, GA (US); Son V. Tran, Alpharetta, GA (US); David R. Newman, Atlanta, GA (US); Leonard F. Antao, Smyrna, GA (US); David O. Slagley, Roswell, GA (US); H. Brock Kolls, Alpharetta, GA (US)

(73) Assignee: The Coca-Cola Company, Atlanta, GA (US)

( * ) Notice: Subject to any disclaimer, the term of this patent is extended or adjusted under 35 U.S.C. 154(b) by 470 days.

(21) Appl. No.: 12/204,514

(22) Filed: Sep. 4, 2008

(65) Prior Publication Data

US 2009/0065520 A1  Mar. 12, 2009

Related U.S. Application Data

(60) Provisional application No. 60/970,509, filed on Sep. 6, 2007, provisional application No. 60/970,512, filed on Sep. 6, 2007, provisional application No. 60/970,513, filed on Sep. 6, 2007.

(51) Int. Cl.
   *G06F 17/00* (2006.01)
(52) U.S. Cl.
   USPC ............................. 700/233; 700/236; 700/239
(58) Field of Classification Search
   USPC .......................................... 700/233, 236, 239
   See application file for complete search history.

(56) References Cited

U.S. PATENT DOCUMENTS

| 3,991,911 A | 11/1976 | Shannon et al. |
| 4,358,171 A | 11/1982 | Christen |
| 4,525,071 A | 6/1985 | Horowitz et al. |
| 4,563,739 A | 1/1986 | Gerpheide et al. |
| 4,819,176 A | 4/1989 | Ahmed et al. |
| 5,147,068 A | 9/1992 | Wright |
| 5,225,819 A | 7/1993 | Hosotani et al. |
| 5,312,017 A | 5/1994 | Schroeder et al. |
| 5,350,082 A | 9/1994 | Kiriakides, Jr. et al. |

(Continued)

FOREIGN PATENT DOCUMENTS

| BE | 1005369 | 6/1993 |
| CN | 1378432 A | 11/2002 |

(Continued)

OTHER PUBLICATIONS

Invitation to Pay Additional Fees and Partial International Search for PCT/US2008/075281 dated Mar. 13, 2009.

(Continued)

*Primary Examiner* — Timothy Waggoner
(74) *Attorney, Agent, or Firm* — Sutherland Asbill & Brennan LLP

(57) ABSTRACT

Embodiments of the invention can include systems and methods for facilitating consumer-dispenser interactions. In one embodiment, a product dispenser is provided. The product dispenser can include a reader configured to read a machine readable item. In addition, the product dispenser can include a controller in communication with the reader, and operable to execute a set of instructions to receive information from the machine readable item associated with a consumer via the reader. Moreover, the controller can be further operable to execute a set of instructions to configure at least one characteristic based at least in part on the information from the machine readable item, and dispense a product.

23 Claims, 11 Drawing Sheets

(56) References Cited

U.S. PATENT DOCUMENTS

| | | | |
|---|---|---|---|
| 5,358,145 A | 10/1994 | Smith et al. | |
| 5,408,917 A | 4/1995 | Luessi | |
| 5,603,430 A | 2/1997 | Loehrke et al. | |
| 5,615,801 A | 4/1997 | Schroeder et al. | |
| 5,691,684 A | 11/1997 | Murrah | |
| 5,715,700 A | 2/1998 | Credle, Jr. | |
| 5,735,436 A | 4/1998 | Schroeder et al. | |
| 5,798,694 A | 8/1998 | Reber et al. | |
| 5,839,610 A | 11/1998 | Reese et al. | |
| 5,842,603 A | 12/1998 | Schroeder et al. | |
| 5,884,807 A | 3/1999 | Yun | |
| 5,997,924 A | 12/1999 | Olander, Jr. et al. | |
| 6,053,359 A | 4/2000 | Goulet et al. | |
| 6,116,460 A | 9/2000 | Kim et al. | |
| 6,119,434 A | 9/2000 | Andersson | |
| 6,131,399 A | 10/2000 | Hall | |
| 6,152,591 A | 11/2000 | McCall et al. | |
| 6,161,059 A | 12/2000 | Tedesco et al. | |
| 6,238,721 B1 | 5/2001 | Knepler | |
| 6,317,649 B1 | 11/2001 | Tedesco et al. | |
| 6,354,468 B1 | 3/2002 | Riek | |
| 6,377,868 B1 | 4/2002 | Gardner, Jr. | |
| 6,378,275 B1 | 4/2002 | Andersson | |
| 6,424,884 B1 | 7/2002 | Brooke et al. | |
| 6,465,035 B1 | 10/2002 | Knepler | |
| 6,470,233 B1 | 10/2002 | Johnson, Jr. | |
| 6,479,086 B1 | 11/2002 | Knepler | |
| 6,564,999 B1 | 5/2003 | Saveliev et al. | |
| 6,572,016 B2 | 6/2003 | Saveliev et al. | |
| 6,618,062 B1 | 9/2003 | Brown et al. | |
| 6,622,064 B2 | 9/2003 | Bartholomew et al. | |
| 6,658,323 B2* | 12/2003 | Tedesco et al. | 700/236 |
| 6,688,134 B2 | 2/2004 | Barton et al. | |
| 6,698,228 B2 | 3/2004 | Kateman et al. | |
| 6,751,525 B1 | 6/2004 | Crisp | |
| 6,756,069 B2 | 6/2004 | Scoville et al. | |
| 6,759,072 B1 | 7/2004 | Gutwein | |
| 6,772,944 B2 | 8/2004 | Brown | |
| 6,799,085 B1 | 9/2004 | Crisp | |
| 6,807,460 B2 | 10/2004 | Black et al. | |
| 6,907,741 B2 | 6/2005 | Kateman | |
| 6,918,258 B2 | 7/2005 | Cunha et al. | |
| 6,941,858 B2 | 9/2005 | Kateman | |
| 6,968,876 B2 | 11/2005 | Yacko et al. | |
| 6,973,478 B1 | 12/2005 | Ketonen et al. | |
| 6,974,928 B2 | 12/2005 | Bloom | |
| 6,980,886 B2 | 12/2005 | Shimoda et al. | |
| 6,980,887 B2 | 12/2005 | Varga et al. | |
| 6,982,640 B2 | 1/2006 | Lindsay et al. | |
| 6,990,391 B1 | 1/2006 | Cunha et al. | |
| 7,009,519 B2 | 3/2006 | Leonard et al. | |
| 7,020,680 B2 | 3/2006 | Defosse | |
| 7,028,861 B2 | 4/2006 | Sayers et al. | |
| 7,031,804 B2* | 4/2006 | Brooke et al. | 700/232 |
| 7,032,818 B2 | 4/2006 | Thomas et al. | |
| 7,053,773 B2 | 5/2006 | McGarry et al. | |
| 7,065,429 B1 | 6/2006 | McClain et al. | |
| 7,082,970 B2 | 8/2006 | Bartholomew et al. | |
| 7,147,131 B2 | 12/2006 | Sher et al. | |
| 7,151,982 B2 | 12/2006 | Liff et al. | |
| 7,156,259 B2 | 1/2007 | Bethuy et al. | |
| 7,161,494 B2 | 1/2007 | Akuzawa | |
| 7,223,427 B2 | 5/2007 | Knepler | |
| 7,231,279 B2 | 6/2007 | Ghidotti | |
| 7,234,609 B2 | 6/2007 | DeLazzer et al. | |
| 7,249,050 B1 | 7/2007 | Walker et al. | |
| 7,331,483 B2 | 2/2008 | Bhimani et al. | |
| 7,353,080 B2* | 4/2008 | Walker et al. | 700/237 |
| 7,387,239 B2 | 6/2008 | Thomas et al. | |
| 7,391,318 B2 | 6/2008 | Higashi | |
| 7,395,134 B2 | 7/2008 | Bartholomew et al. | |
| 7,499,768 B2 | 3/2009 | Hoersten et al. | |
| 7,499,769 B2* | 3/2009 | Walker et al. | 700/240 |
| 7,627,496 B2 | 12/2009 | Walker et al. | |
| 7,640,755 B1 | 1/2010 | Kateman | |
| 7,673,555 B2 | 3/2010 | Nosler et al. | |
| 7,912,579 B2 | 3/2011 | Stettes | |
| 7,918,368 B2 | 4/2011 | Crisp, III et al. | |
| 8,340,815 B2 | 12/2012 | Peters et al. | |
| 2002/0059175 A1 | 5/2002 | Nakano | |
| 2002/0065579 A1 | 5/2002 | Tedesco et al. | |
| 2002/0077889 A1 | 6/2002 | Kolls | |
| 2002/0116261 A1 | 8/2002 | Moskowitz et al. | |
| 2002/0123926 A1 | 9/2002 | Bushold et al. | |
| 2002/0129712 A1 | 9/2002 | Westbrook et al. | |
| 2002/0143626 A1 | 10/2002 | Voltmer et al. | |
| 2002/0161653 A1 | 10/2002 | Walker et al. | |
| 2002/0183893 A1 | 12/2002 | Brooke et al. | |
| 2003/0010791 A1 | 1/2003 | Gentiluomo et al. | |
| 2003/0032474 A1 | 2/2003 | Kaminkow | |
| 2003/0083758 A1 | 5/2003 | Williamson | |
| 2003/0129286 A1 | 7/2003 | Knepler | |
| 2003/0191709 A1 | 10/2003 | Elston et al. | |
| 2003/0216964 A1 | 11/2003 | MacLean et al. | |
| 2004/0044584 A1 | 3/2004 | Chung | |
| 2004/0103033 A1 | 5/2004 | Reade et al. | |
| 2004/0113786 A1 | 6/2004 | Maloney | |
| 2004/0129720 A1 | 7/2004 | Cheng et al. | |
| 2004/0226994 A1 | 11/2004 | Brown | |
| 2004/0243259 A1 | 12/2004 | Peterson et al. | |
| 2005/0003068 A1 | 1/2005 | Kester et al. | |
| 2005/0075900 A1 | 4/2005 | Arguimbau | |
| 2005/0143857 A1 | 6/2005 | Chirnomas | |
| 2005/0167493 A1 | 8/2005 | Barton et al. | |
| 2005/0178144 A1 | 8/2005 | Crisp | |
| 2005/0178793 A1 | 8/2005 | Cheng et al. | |
| 2005/0182599 A1 | 8/2005 | Knepler | |
| 2005/0192705 A1 | 9/2005 | Pinney et al. | |
| 2005/0205666 A1 | 9/2005 | Ward et al. | |
| 2005/0258961 A1 | 11/2005 | Kimball et al. | |
| 2005/0276883 A1 | 12/2005 | Jeffrey et al. | |
| 2006/0000851 A1 | 1/2006 | Girard et al. | |
| 2006/0043101 A1 | 3/2006 | Bhimani et al. | |
| 2006/0043111 A1 | 3/2006 | Jennings et al. | |
| 2006/0051614 A1 | 3/2006 | Su et al. | |
| 2006/0054614 A1 | 3/2006 | Baxter et al. | |
| 2006/0081653 A1 | 4/2006 | Boland et al. | |
| 2006/0102645 A1 | 5/2006 | Walker et al. | |
| 2006/0108415 A1 | 5/2006 | Thomas et al. | |
| 2006/0111978 A1 | 5/2006 | Tietzen et al. | |
| 2006/0115570 A1 | 6/2006 | Guerrero et al. | |
| 2006/0115572 A1 | 6/2006 | Guerrero et al. | |
| 2006/0131329 A1 | 6/2006 | Sayers et al. | |
| 2006/0144244 A1 | 7/2006 | Girard et al. | |
| 2006/0180647 A1 | 8/2006 | Hansen | |
| 2006/0192003 A1 | 8/2006 | Chung | |
| 2006/0224696 A1 | 10/2006 | King et al. | |
| 2006/0247824 A1 | 11/2006 | Walker et al. | |
| 2006/0261156 A1 | 11/2006 | Brown | |
| 2006/0272922 A1 | 12/2006 | Hoersten et al. | |
| 2007/0016852 A1 | 1/2007 | Kim et al. | |
| 2007/0027576 A1* | 2/2007 | Juds et al. | 700/232 |
| 2007/0044820 A1 | 3/2007 | Chan et al. | |
| 2007/0087756 A1 | 4/2007 | Hoffberg | |
| 2007/0124204 A1 | 5/2007 | De Boer et al. | |
| 2007/0252709 A1 | 11/2007 | Collins et al. | |
| 2007/0299555 A1 | 12/2007 | Walker et al. | |
| 2008/0004973 A1 | 1/2008 | Rothschild | |
| 2008/0029541 A1 | 2/2008 | Wallace et al. | |
| 2008/0051193 A1 | 2/2008 | Kaminkow et al. | |
| 2008/0116262 A1 | 5/2008 | Majer | |
| 2008/0173705 A1 | 7/2008 | Girard et al. | |
| 2008/0201241 A1 | 8/2008 | Pecoraro | |
| 2009/0069930 A1 | 3/2009 | Peters et al. | |
| 2009/0069931 A1 | 3/2009 | Peters et al. | |
| 2009/0069949 A1 | 3/2009 | Carpenter et al. | |
| 2010/0114368 A1 | 5/2010 | Walker et al. | |
| 2010/0116842 A1 | 5/2010 | Hecht et al. | |
| 2011/0315711 A1 | 12/2011 | Hecht et al. | |
| 2012/0037008 A1 | 2/2012 | Rodriguez | |
| 2013/0079926 A1 | 3/2013 | Peters et al. | |

(56) References Cited

U.S. PATENT DOCUMENTS

FOREIGN PATENT DOCUMENTS

| | | |
|---|---|---|
| DE | 4013147 | 10/1991 |
| EP | 1165428 | 7/2003 |
| EP | 1626375 A1 | 2/2006 |
| EP | 1637055 | 3/2006 |
| FR | 2624844 | 6/1989 |
| FR | 2624844 A | 6/1989 |
| GB | 2416757 A | 9/2004 |
| JP | S59-055597 | 3/1984 |
| JP | S61-288289 | 12/1986 |
| JP | H05-089329 | 4/1993 |
| JP | H05-094577 | 4/1993 |
| JP | H05-128349 | 5/1993 |
| JP | 11262649 A | 9/1999 |
| JP | 2000099822 A | 4/2000 |
| JP | 2001250161 A | 9/2001 |
| JP | 2001-319026 | 11/2001 |
| JP | 2002099950 A | 4/2002 |
| JP | 2002245536 A | 8/2002 |
| JP | 2002538561 A | 11/2002 |
| JP | 2003016164 A | 1/2003 |
| JP | 2003506184 | 2/2003 |
| JP | 2003121505 A | 4/2003 |
| JP | 2003-303372 | 10/2003 |
| JP | 2003337974 A | 11/2003 |
| JP | 2005089329 A | 4/2005 |
| JP | 2005094577 A | 4/2005 |
| JP | 2005276148 A | 10/2005 |
| JP | 2006309336 A | 11/2006 |
| JP | 2009524868 A | 7/2009 |
| RU | 2146102 | 10/2000 |
| RU | 2297385 | 4/2007 |
| WO | 9837518 A1 | 8/1998 |
| WO | 0211087 A1 | 2/2002 |
| WO | 2083282 A | 10/2002 |
| WO | 2005063091 A1 | 7/2005 |
| WO | 2005091236 A1 | 9/2005 |
| WO | 2006101394 A | 9/2006 |
| WO | 2006101394 A2 | 9/2006 |
| WO | 2006131431 A1 | 12/2006 |
| WO | 2007056407 A2 | 5/2007 |
| WO | 2007070032 A1 | 6/2007 |
| WO | 2007085925 | 8/2007 |
| WO | 2007127525 A2 | 11/2007 |
| WO | 2009032911 A1 | 3/2009 |
| WO | 2009032938 A2 | 3/2009 |
| WO | 2009032942 A2 | 3/2009 |
| WO | 2009032946 A1 | 3/2009 |

OTHER PUBLICATIONS

International Search Report and Written Opinion for PCT/US2008/075235 dated Feb. 4, 2009.
International Search Report and Written Opinion for PCT/US2008/075287 dated Feb. 18, 2009.
International Search Report and Written Opinion for PCT/US2008/075272 dated Apr. 6, 2009.
International Search Report and Written Opinion for PCT/US2008/075277 dated Apr. 24, 2009.
Disclosure Under 37 C.F.R. §1.56 as filed Dec. 22, 2008.
International Search Report and Written Opinion for PCT/US2009/035410 dated Apr. 14, 2009.
International Search Report and Written Opinion for PCT/US2009/035414 dated Mar. 23, 2009.
International Search Report and Written Opinion for PCT/US2009/035407 dated Apr. 28, 2009.
Notification of Transmittal of the International Search Report and the Written for International Application No. PCT/US2008/075263 mailed Mar. 19, 2009.
International Search Report for International Application No. PCT/US2008/075263 mailed Mar. 19, 2009.
Written Opinion for International Application No. PCT/US2008/075263 mailed Mar. 19, 2008.
Notification of Transmittal of the International Preliminary Report on Patentability for International Application No. PCT/US2008/075263 mailed Jan. 15, 2010.
International Preliminary Report on Patentability for International Application No. PCT/US2008/075263 mailed Jan. 15, 2010.
English LanguageTranslation of First Office Action for Chinese Application No. 2008801120450 mailed Nov. 30, 2011.
Examiner's First Report for Australian Application No. 2008296257 mailed Jun. 7, 2012.
DE4013147; International Search Report for International Application No. PCT/US2008/075263 (English language translation is unavailable).
Notification of Transmittal of and the International Preliminary Report on Patentability for International Application No. PCT/US2008/075272 mailed Dec. 29, 2010.
Notification of Transmittal of and the International Preliminary Report on Patentability for International Application No. PCT/US2008/075277 mailed Jan. 15, 2010.
Notification of Transmittal of and the International Preliminary Report on Patentability for International Application No. PCT/US2008/075287 mailed Jan. 15, 2010.
English Language Translation of Second Office Action for Chinese Application No. 2008801120450 mailed Oct. 31, 2012.
English Language Translation of Notice of Reasons for Rejection for Japanese Application No. 2010-524139 mailed Feb. 22, 2013.
Examiner's First Report for Australian Application No. 2008296266 mailed Jun. 14, 2012.
European Communication pursuant to Rules 161(1) and 162 EPC for European Application No. 08829155.4 mailed Jun. 9, 2010.
English Language Translation of the Formal Examination for Russian Application No. 2010111632 mailed May 17, 2010.
English Language Translation of First Office Action for Russian Application No. 2010111632 mailed May 22, 2012.
Non-Final Office Action for related U.S. Appl. No. 12/204,531 mailed May 13, 2011.
Final Office Action for related U.S. Appl. No. 12/204,531 mailed Oct. 19, 2011.
Non-Final Office Action for related U.S. Appl. No. 12/204,531 mailed Apr. 6, 2012.
Notice of Allowance for related U.S. Appl. No. 12/204,531 mailed Aug. 21, 2012.
English Language Translation of First Office Action for Chinese Application No. 2008801120304 mailed Aug. 23, 2011.
English Language Translation of First Office Action for Chinese Application No. 2008801120412 mailed May 3, 2012.
English Language Translation of First Office Action for Mexican Application No. MX/a/2010/002216 mailed May 28, 2012.
English Language Translation of First Office Action for Mexican Application No. MX/a/2010/002294 mailed Apr. 15, 2013.
English Language Translation of First Office Action for Russian Application No. 2010111244 mailed Apr. 26, 2012.
English Language Translation of First Office Action for Russian Application No. 2010111631 mailed May 21, 2012.
English Language Translation of First Office Action for Chinese Application No. 2008801120446 mailed Jul. 21, 2011.
English Language Translation of Notice of Reasons for Rejection for Japanese Application No. 2010524145 mailed Feb. 26, 2013.
English Language Translation of Notice of Reasons for Rejection for Japanese Application No. 2010524146 mailed Dec. 25, 2012.
English Language Translation of Notice of Reasons for Rejection for Japanese Application No. 2010524147 mailed Mar. 21, 2013.
English Language Translation of Notice of Reasons for Rejection for Japanese Application No. 2010524149 mailed Dec. 25, 2012.
English Language Translation of Second Office Action for Chinese Application No. 2008801120304 mailed May 9, 2012.
English Language Translation of Second Office Action for Chinese Application No. 2008801120412 mailed Mar. 19, 2013.
English Language Translation of the Formal Examination for Russian Application No. 2010110466 mailed Apr. 9, 2010.
English Language Translation of Third Office Action for Chinese Application No. 2008801120304 mailed Feb. 5, 2013.
Examination Report for European Application No. 08829155.4 mailed May 10, 2013.

(56) References Cited

OTHER PUBLICATIONS

Examiner's First Report for Australian Application No. 2008296269 mailed Jun. 8, 2012.
Examiner's First Report for Australian Application No. 2008296270 mailed Dec. 12, 2011.
Examiner's First Report for Australian Application No. 2008296274 mailed Jun. 1, 2012.
Final Office Action for related U.S. Appl. No. 12/204,544 mailed Oct. 7, 2011.
Final Office Action for related U.S. Appl. No. 12/204,494 mailed Mar. 7, 2013.
Non-Final Office Action for related U.S. Appl. No. 121204,494 mailed Jul. 5, 2012.
Non-Final Office Action for related U.S. Appl. No. 12/204,544 mailed May 27, 2011.
Final Office Action for related U.S. Appl. No. 12/204,485 mailed Jul. 29, 2011.
Non-Final Office Action for related U.S. Appl. No. 12/204,485 mailed Mar. 14, 2011.
Non-Final Office Action for related U.S. Appl. No. 12/204,494 mailed Mar. 16, 2011.
Non-Final Office Action for related U.S. Appl. No. 12/204,494 mailed Oct. 17, 2011.
Non-Final Office Action for related U.S. Appl. No. 12/204,494 mailed Oct. 7, 2010.
Non-Final Office Action for related U.S. Appl. No. 12/204,544 mailed Apr. 26, 2012.
Non-Final Office Action for related U.S. Appl. No. 13/683,987 mailed Apr. 3, 2013.
Notice of Allowance for related U.S. Appl. No. 12/204,544 mailed Jan. 16, 2013.
Notice of Allowance for related U.S. Appl. No. 12/204,544 mailed May 13, 2013.
Notification of Transmittal of and the International Preliminary Report on Patentability for International Application No. PCT/US2008/075281 mailed Nov. 17, 2009.
Notification of Transmittal of and the International Search Report and Written Opinion for International Application No. PCT/US2008/075281 mailed Jun. 26, 2009.
English Language Translation of First Office Action for Russian Application No. 2010110466 mailed May 14, 2012.

* cited by examiner

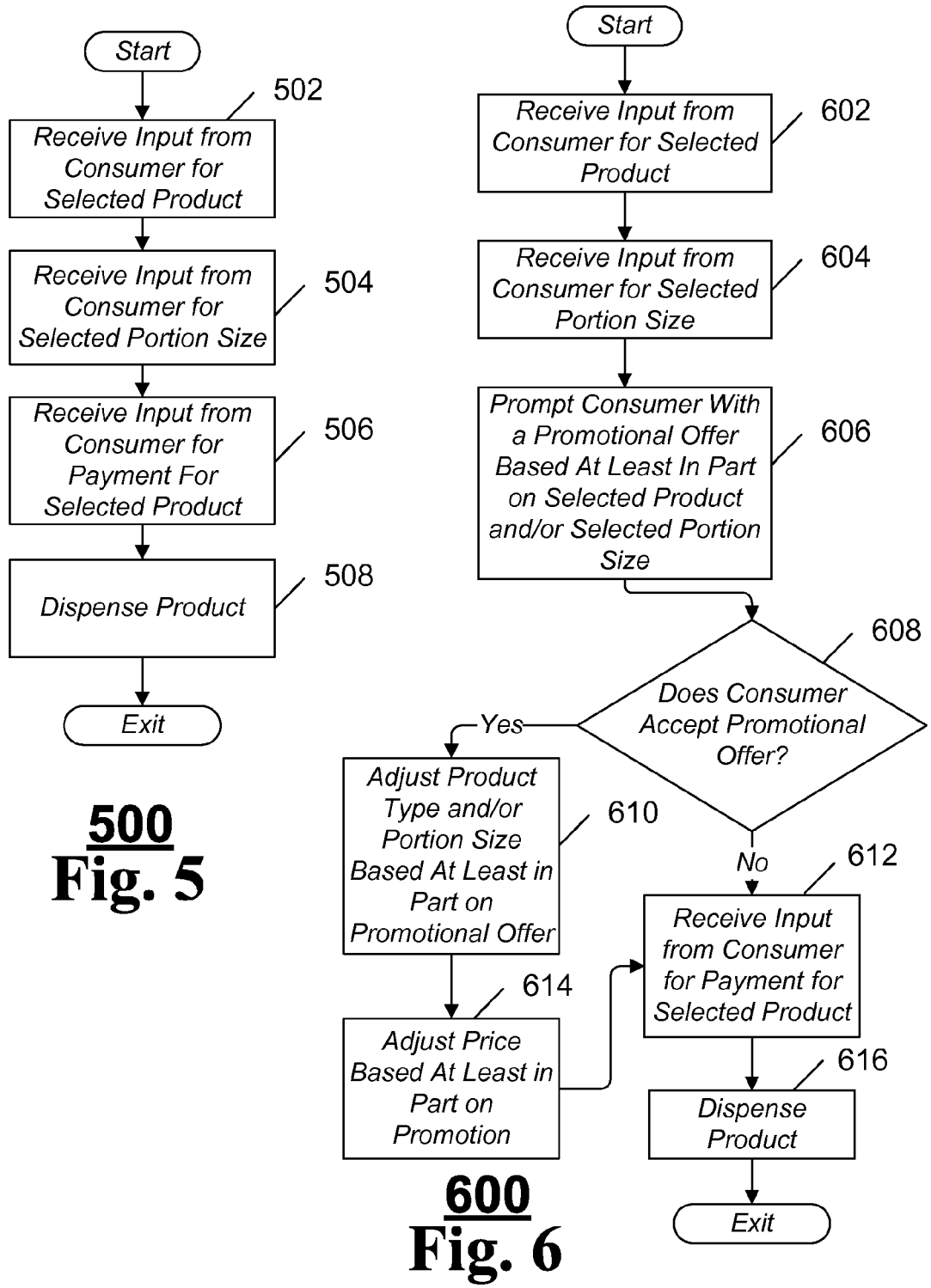

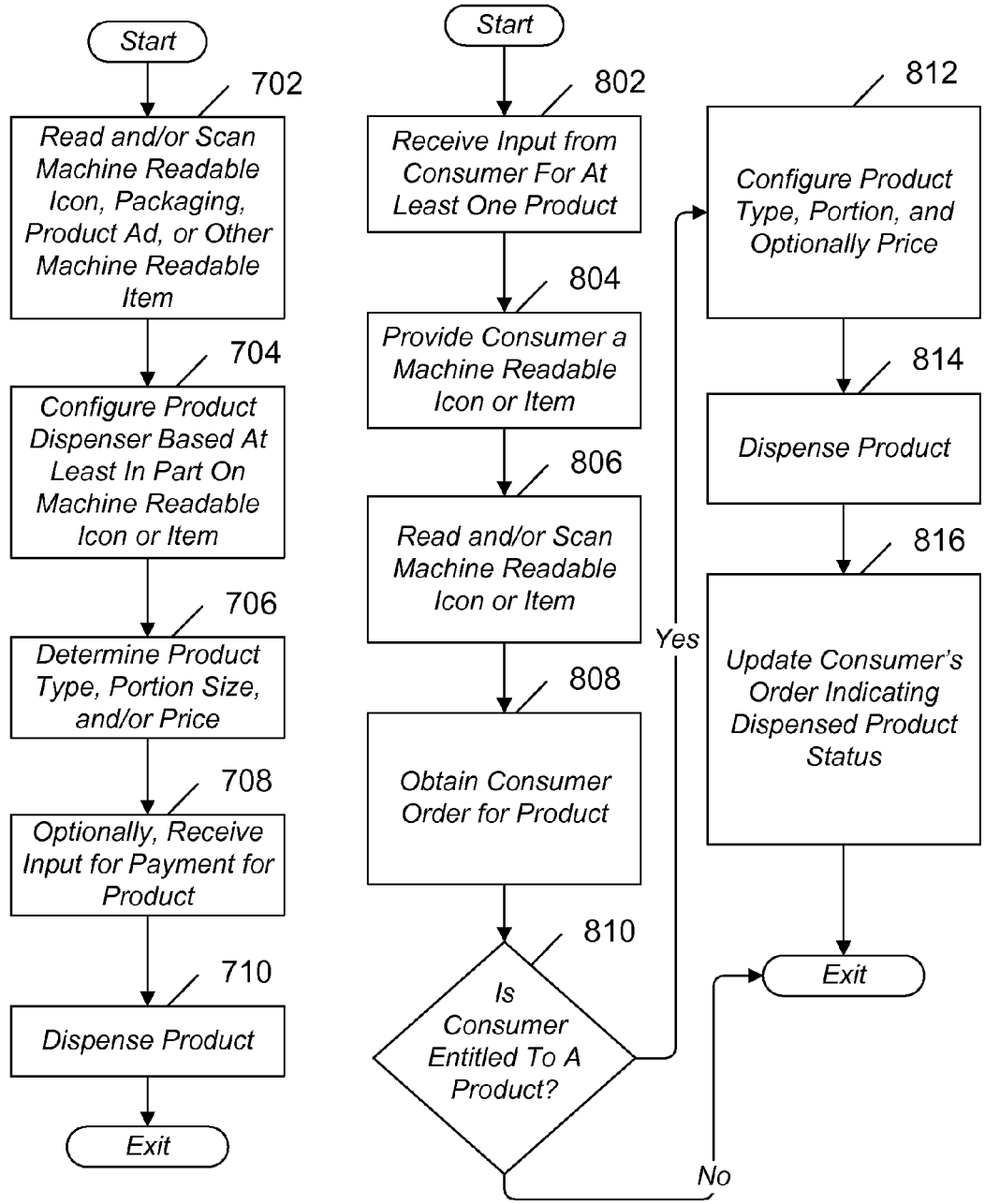

1100

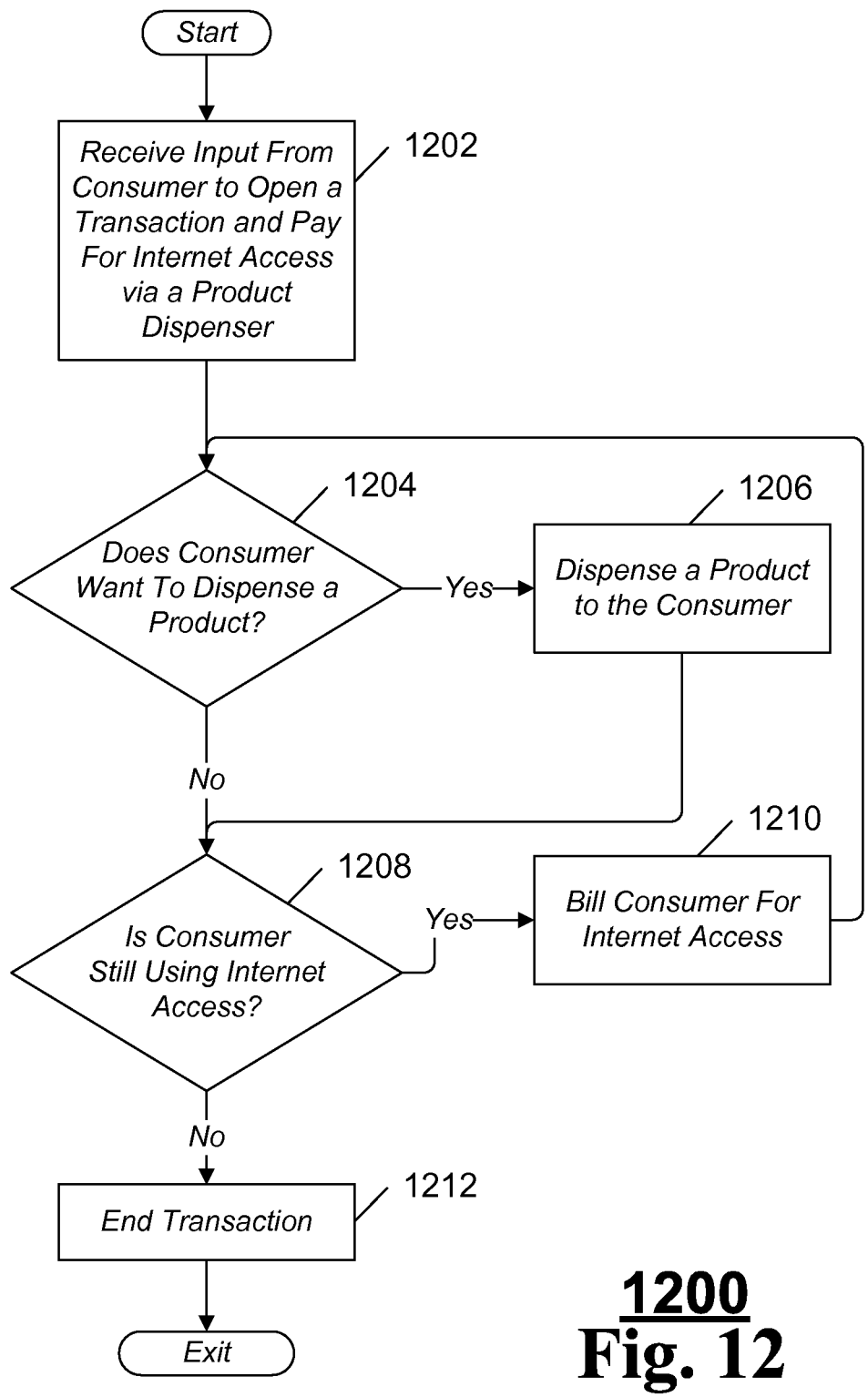

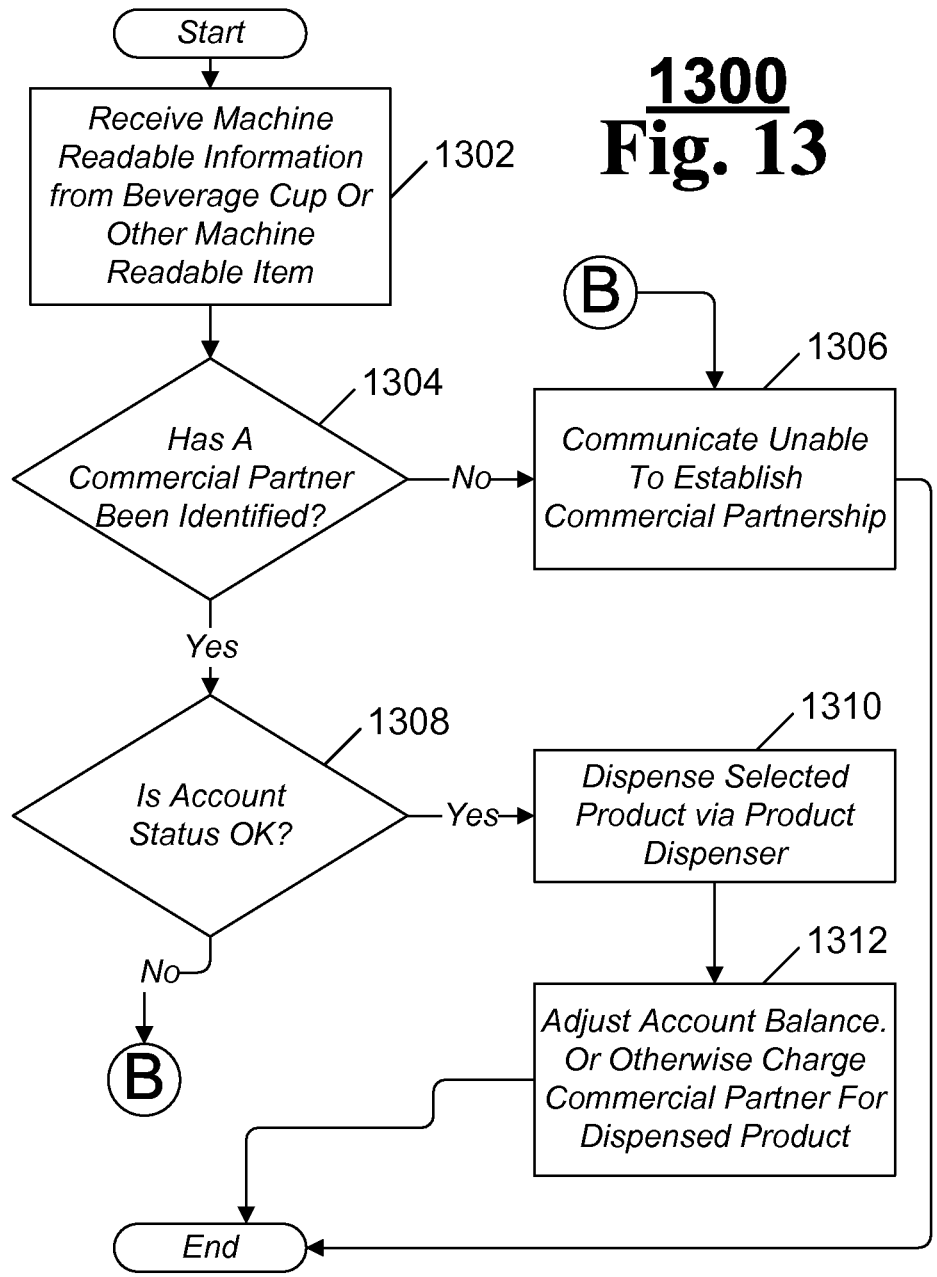

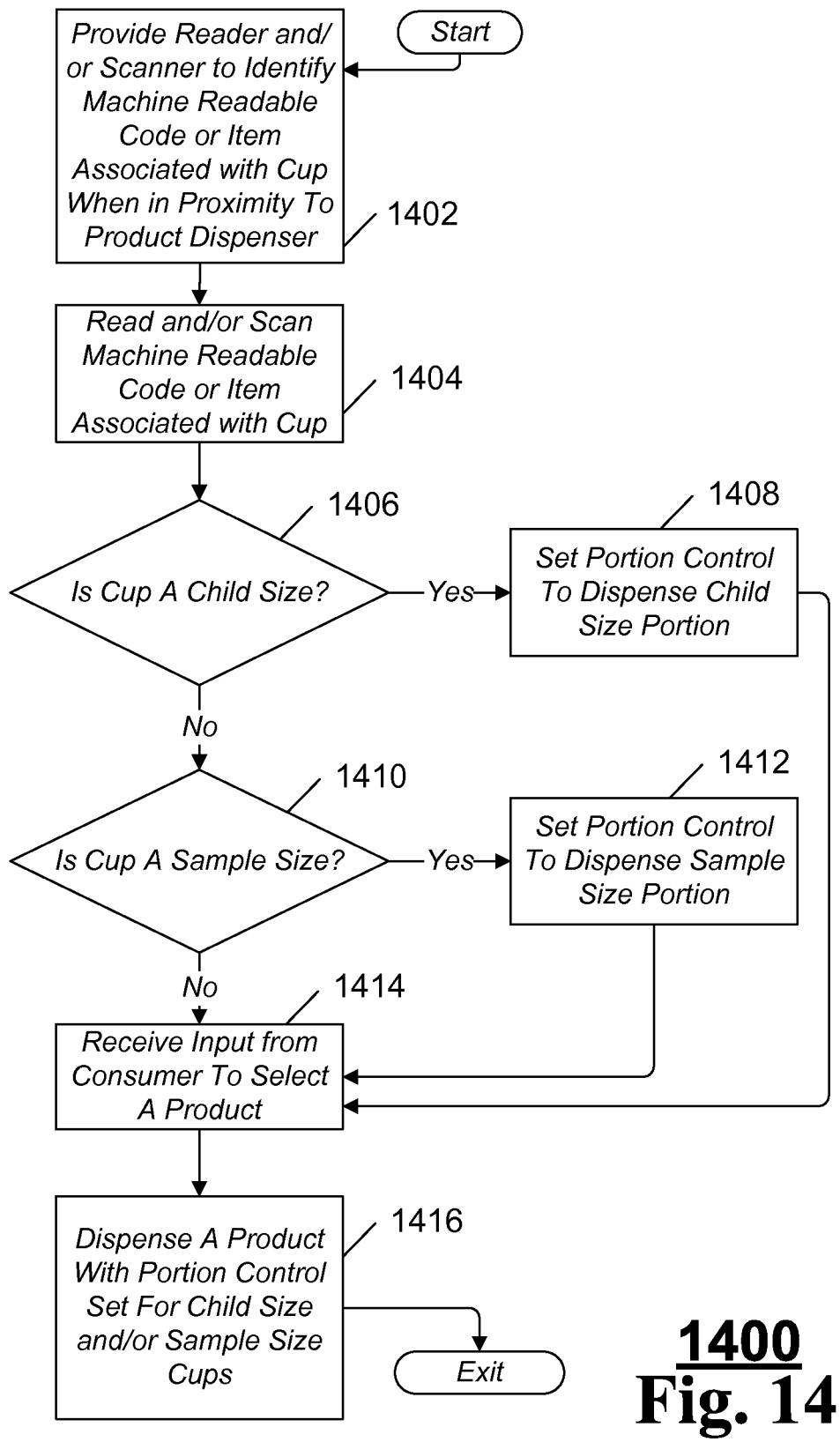

SYSTEMS AND METHODS FOR FACILITATING CONSUMER-DISPENSER INTERACTIONS

RELATED APPLICATIONS

This application claims priority to U.S. Provisional Ser. No. 60/970,512, entitled "Systems and Methods for Facilitating Consumer-Dispenser Interactions," filed on Sep. 6, 2007; U.S. Provisional Ser. No. 60/970,509, entitled "Systems and Methods for Facilitating Consumer-Dispenser Interactions," filed on Sep. 6, 2007; and U.S. Provisional Ser. No. 60/970,513, entitled "Systems and Methods for Facilitating Consumer-Dispenser Interactions," filed on Sep. 6, 2007, the contents of which are incorporated by reference.

TRADEMARKS

COCA-COLA® is a registered trademark of The Coca-Cola Company, Atlanta, Ga., U.S.A. Other names, symbols, designs, or logos used herein may be registered trademarks, trademarks or product names of The Coca-Cola Company or other companies.

TECHNICAL FIELD

This invention relates to product dispensers, and in particular, relates to systems and methods for facilitating consumer-dispenser interactions.

BACKGROUND OF THE INVENTION

Conventional beverage dispensers can pour a beverage by combining a syrup, sweetener, and/or water. To create a finite variety of beverage selections different kinds of syrup can be offered. This typically results in being able to offer a finite number of branded and non-branded beverage selections. As an example, a single prior art dispenser using several different kinds of syrup might be able to offer limited choices of COCA-COLA™, DIET COCA-COLA™, SPRITE™, and a few other branded or non-branded beverage selections.

One problem with these types of conventional beverage dispensers is that only a limited number of drinks can be offered. As such, conventional beverage dispensers may be limited in being able to offer the consumer what they want. In this regard, consumers want a wider menu of beverage selections and the ability to customize their beverage. Research suggests that they want more beverage variations even for a traditional branded beverage. For example, offering COCA-COLA™, COCA-COLA™ with lime, CHERRY COCA-COLA™, VANILLA COCA-COLA™ and numerous other types of COCA-COLA™ beverage variations. Offering all the variations possible for a single drink brand such as COCA-COLA™ is impractical in conventional beverage dispensers in part because conventional beverage dispensers have limited capacity and selection capability. They may not offer the consumer what the consumer wants, that is, a complete variety of choices for all types of branded and non-branded beverages.

SUMMARY OF THE INVENTION

Some or all of the above needs and/or problems may be addressed by embodiments of the invention. Certain embodiments of the invention can include systems and methods for facilitating consumer-dispenser interactions. In one embodiment, a product dispenser is provided. The product dispenser can include a reader configured to read machine readable item. In addition, the product dispenser can include a controller in communication with the reader, and operable to execute a set of instructions to receive information from the machine readable item associated with a consumer via the reader. Moreover, the controller can be further operable to execute a set of instructions to configure at least one characteristic based at least part on the information from the machine readable item, and dispense a product.

In one embodiment, a method for operating a product dispenser can be provided. The method can include receiving information from a machine readable item associated with a consumer. In addition, the method can include configuring at least one characteristic based at least part on the information from the machine readable item. Further, the method can include dispensing a product.

In another embodiment, a method for operating a product dispenser can be provided. The method can include receiving product selection information from a consumer. In addition, the method can include providing promotional information to the consumer based at least in part on the product selection information. Furthermore, the method can include dispensing a product.

In yet another embodiment, a method for operating a product dispenser can be provided. The method can include receiving information associated with a consumer. Based at least in part on the information associated with the consumer, the method can identify whether a commercial partner associated with the consumer exists. In addition, the method can include dispensing a product in accordance with the determination whether a commercial partner exists.

Additional systems, methods, dispensers, features and aspects are realized through the techniques of various embodiments of the invention. Other embodiments and aspects of the invention are described in detail herein and are considered a part of the claimed invention. Other aspects and features can be understood with reference to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and aspects of the invention are apparent from the following detailed description taken in conjunction with the accompanying drawings in which:

FIGS. 5-6 illustrate example methods of allowing a consumer to select product formulation and portion size, and effectuate a promotional offer in accordance with an embodiment of the invention.

FIG. 7 illustrates one example method of scanning a machine readable icon to configure a product dispenser in accordance with an embodiment of the invention.

FIG. 8 illustrates one example method of allowing a consumer to order a product and then scanning a machine readable item at a product dispenser to effectuate order fulfillment by way of a product dispenser in accordance with an embodiment of the invention.

FIG. 12 illustrates one example method of dispensing free products to a consumer while the consumer is paying for Internet access in accordance with an embodiment of the invention.

FIG. 13 illustrates one example method of a consumer utilizing a product dispenser and adjusting a commercial partner account to pay for the product in accordance with an embodiment of the invention.

FIG. 14 illustrates one example method of using portion control for child size and sample size cups in accordance with an embodiment of the invention.

The detailed description explains various embodiments of the invention, together with aspects and features, by way of example with reference to the drawings.

DETAILED DESCRIPTION OF EMBODIMENTS OF THE INVENTION

As used herein, the terms "beverage forming dispenser", "product dispenser", "beverage dispenser", "dispenser apparatus", and "dispenser" refer to a device which dispenses a product such as a beverage, can, bottle, or container.

As used herein, the terms "product" and "beverage", and their pluralized forms, are used synonymously, and embodiments of the invention should not be limited in scope by the use of either term.

Figure 1:
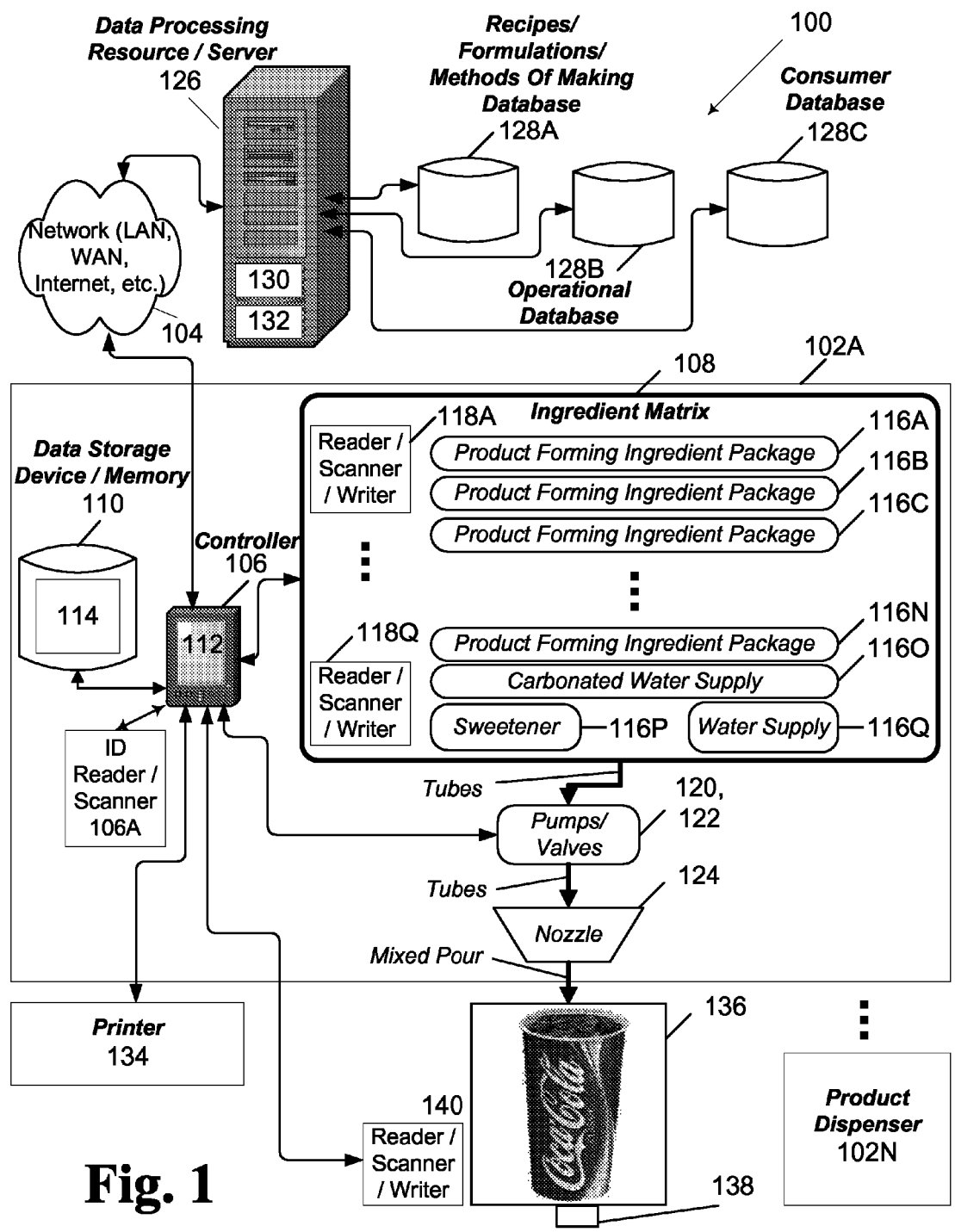
FIG. 1 illustrates an example system including a product dispenser and associated network in accordance with an embodiment of the invention.

Turning now to the drawings in greater detail, an example system 100 for a product dispenser according to an embodiment of the invention is shown in FIG. 1. The example system, such as 100, can operate with a networked computer environment which includes at least one network in communication with a product dispenser. For example in FIG. 1, a product dispenser, such as 102A is shown in communications with a communications network, such as 104. In this embodiment, at least one of the product dispensers, such as 102A, can interface with a consumer, customer, or other user. Other example environments or systems for a product dispenser according to an embodiment of the invention may include non-network configurations.

The example product dispenser, such as 102A, shown in FIG. 1, can be a client-type device. Each product dispenser, such as 102A-102N, can be a computer or processor-based device capable of communicating with the communications network, such as 104, via a signal, such as a wireless frequency signal or a direct wired communication signal.

Each product dispenser, such as 102A, can include a processor or controller 106, an identification reader/scanner device 106A, an ingredient matrix 108, a computer-readable medium, such as a random access memory (RAM) 110, coupled to the processor or controller 106, and an input/output device, such as display device 112. The processor or controller, such as 106, can execute computer-executable program instructions stored in memory, such as 110. Computer executable program instructions stored in memory, such as 110, can include any number of module application programs, such as a consumer interaction engine or module, such as 114. The consumer interaction engine or module, such as 114, can be adapted to implement various methods for consumer-dispenser interactions. In addition, a consumer interaction engine or module, such as 114, can be adapted to receive one or more signals from one or more consumers, remote and/or local servers or data processing resources, and client-type devices or wireless communication devices. Other examples of functionality and aspects of embodiments of a consumer interaction engine or module, such as 114, are described below.

The identification reader/scanner device 106A shown in FIG. 1 can be in communication with the controller 106, and can receive or otherwise obtain identification information from any number of devices or means associated with a consumer. For example, an identification reader/scanner device, such as 106A, can include a machine readable code technology such as bar code, or may include any wireless communication technology such as RFID, reflected light frequency, optical, etc.

As shown in FIG. 1, the processor or controller, such as 106, can be in communication with an ingredient matrix, such as 108, to control, monitor, and track the addition, flow, and removal of some or all of the ingredients to or from the matrix, such as 108. An ingredient matrix can be, for example, a series of receptacles or mountings capable of receiving or mounting to a respective product ingredient package or other product ingredient supply. For example, a product ingredient package, such as 116A, can be manufactured as a pouch of liquid secured in a plastic ridged container to allow insertion into an ingredient matrix, such as 108. When inserted into the ingredient matrix, such as 108, the package, such as 116A, or pouch can be pierced by at least one associated fitting which allows the liquid in the package, such as 116A, or pouch to be pumped or otherwise metered by the controller, such as 106, or the matrix, such as 108, and associated equipment in precise ratios to form the desired product, such as a beverage. In one embodiment, one or more product ingredient packages, such as 116A-116Q, can be inserted into an ingredient matrix, such as 108. The ingredient matrix, such as 108, in this embodiment can secure some or all of the product ingredient packages, such as 116A-116Q. In one embodiment, one or more product packages, such as 116O, 116P, 116Q may be direct supplies rather than packages. For example, a product package, such as 116O, can be a continuous supply of carbonated water provided from a carbonated water source; a product package, such as 116P, can be a sweetener provided from a sweetener source such as a non-nutritive sweetener (NNS) or high fructose corn syrup (HFCS); and a product package, such as 116Q, can be a continuous supply of water from a tap, purified, or distilled water source. In any embodiment, ingredients, components, or product additives may be in the form of a pouch, or may be in another configuration suitable for access by the ingredient matrix, such as 108.

In the embodiment shown in FIG. 1, a product dispenser, such as 102A, with an ingredient matrix, such as 108, can include one or more machine readable code readers, such as 118A-118Q, utilizing a machine readable code technology such as bar code, RFID, reflected light frequency, optical, etc. In one embodiment, at least one machine readable code reader, such as 118A-118Q, can be associated with a location associated with an ingredient matrix, such as 108, wherein some or all of the product ingredient packages, such as 116A-116Q, can be scanned, read, or otherwise identified prior to insertion into or connection with the ingredient matrix, such as 108. In this regard, the processor or controller, such as 106, can receive or obtain information related to some or all of the product ingredient packages, such as 116A-116Q, and use such information to identify within the ingredient matrix, such as 108, an optimum or other desired location within the ingredient matrix, such as 108, for placement of the product ingredient package, such as 116A. For example, data from a product ingredient package, such as 116A, can be read, scanned, or identified from a serial number or identification code associated with the product ingredient package, such as 116A. Such data can be utilized alone or correlated with previously stored information in at least one database, such as 128A-128C, described below, or with data otherwise accessible or stored by a data processing resource or server, described below, such as 126, which may identify one or more ingredients associated with the product ingredient package, such as 116A. In another example, data from a product ingredient package, such as 116A, can be an ingredient code or identifier, and can be utilized alone or correlated with previously stored information in a database, such as 128A-128C, or with data otherwise accessible or stored by a data processing resource or server, such as 126, which may identify one or more ingredients associated with the product ingredient package, such as 116A.

In the embodiment shown in FIG. 1, a product dispenser, such as 102A, with an ingredient matrix, such as 108, can include one or more pumps and/or valves, such as 120 and 122, respectively, and a nozzle, such as 124. In this example, each of the pumps, such as 120, and valves, such as 122, can be controlled by the product dispenser, such as 102A. For instance, the processor or controller, such as 106, can be in communication with some or all of the pumps, such as 120, and valves, such as 122. In this regard, some or all of the pumps, such as 120, and/or valves, such as 122, can be selectively operated by the processor or controller, such as 106, to pump, meter, or otherwise obtain respective products or ingredients from certain of the product ingredient packages, such as 116A-116Q, to dispense a custom product or beverage.

In one embodiment, an ingredient matrix, such as 108, can have multiple product ingredient packages, such as 116A-116Q, inserted into it, wherein each package may contain a different or unique ingredient. By way of one or more commands or instructions from a processor or controller, such as 106, to one or more pumps, such as 120, and/or valves, such as 122, associated with the ingredient matrix, such as 108, varying ratios of ingredients from some or all of the product ingredient packages, such as 116A-116Q, can be selectively combined to form various types of products, such as beverages. Example ingredients can include, but are not limited to, a flavoring, a concentrate, a syrup, a sweetener, water, carbonated water, a lime flavoring, a vanilla flavoring, a cherry flavoring, and any ingredient part of a branded or non-branded drink, such as CHERRY COCA-COLA™, VANILLA COCA-COLA™, COCA-COLA™, DIET COCA-COLA™, and FANTA™.

In one embodiment, one or more of the product ingredient packages, such as 116A-116Q, may contain ingredients referred to as "pungent", which may limit their placement within an ingredient matrix, such as 108. Pungent-type ingredients can be relatively strong such that once a pungent ingredient is pumped or otherwise drawn through a particular portion of a product dispenser, such as 102A, any associated path through the dispenser, such as 102A, such as tubing in the product dispenser, such as 102A, may be permanently flavored and any subsequent ingredient or fluid that is pumped or drawn through the path or tubing may be tainted with the taste of the pungent-type ingredient. As such, once a pungent-type ingredient is used in an ingredient matrix, such as 108, an associated processor or controller, such as 106, can track or otherwise store information that controls or limits the replacement and/or addition of other pungent ingredients to certain locations of the ingredient matrix, such as 108, to avoid mixing pungent-type ingredients or tainting non-pungent ingredients in order to maintain product or beverage quality.

In another embodiment, one or more product ingredient packages, such as 116A-116Q, may require agitation to keep the associated ingredients sufficiently mixed. In such instances, the location of such ingredients in an ingredient matrix, such as 108, can be limited to locations within the ingredient matrix, such as 108, that can be agitated as may be required and/or desired in a particular embodiment.

In another embodiment, ingredients from one or more of product ingredient packages, such as 116A-116Q, may be dispensed through antimicrobial-type tubing and/or dispenser parts. Such ingredients can include, but are not limited to, milk, dairy, soy, and/or other types and kinds of product ingredient packages. In these instances, the location of such ingredients in an ingredient matrix, such as 108, can be limited to locations within the ingredient matrix, such as 108, that utilize suitable antimicrobial-type tubing and/or dispenser parts as may be required and/or desired in a particular embodiment.

In yet another embodiment, a one-to-one relationship can be established between a particular product ingredient package, such as 116A, and at least one pump and/or valve, such as 120 and/or 122, respectively. In some instances, utilizing more than one pump and/or valve for a single product ingredient package, such as 116A, can draw a relatively higher volume of an ingredient from the package, such as 116A, in a relatively shorter period of time. For example, a product ingredient package containing a sweetener, such as sweetener, such as 116P, may utilize more than one pump and/or valve to draw a relatively higher volume of an ingredient from the package 116P in a relatively shorter period of time.

Returning to FIG. 1, any number of other product dispensers, such as 102A-102N, can also be in communication with the network, such as 104. In one embodiment, the communications network, such as 104, shown in FIG. 1 can be a local area network (LAN). In another embodiment, a communications network can be a wireless communications network capable of transmitting both voice and data signals, including image data signals or multimedia signals. Other networks can include, but are not limited to, Internet, a local area network (LAN), a wide area network (WAN), a LON WORKS network, a wired network, a wireless network, or any combination thereof.

The network, such as 104 of FIG. 1, is also shown in communication with at least one data processing resource, such as a server 126, and at least one database, such as 128A. In this embodiment, a server such as 126 can be a processor-based device capable of communicating with some or all of the product dispensers, such as 102A-102N, via the communications network, such as 104, by way of a signal, such as a wireless frequency signal or a direct wired communication signal. In addition, a data processing resource or server, such as 126, can be used to aid or facilitate recipes, formulations, methods of making products or beverages, provide operational data processing, perform data processing related to consumer interaction, and/or perform other data processing as may be required and/or desired in a particular embodiment. Such operational data processing can include, for example and not as a limitation, equipment status, maintenance, service alerts, predictive restock, and/or other types and kinds of operational data processing as may be required and/or desired in a particular embodiment. Such consumer interaction support can include, for example and not as a limitation, consumer preferences, consumer product or beverage preferences, loyalty, gaming, prizes, media content, customizations, and/or other types and kinds of consumer interaction and/or data processing support as may be required and/or desired by a particular embodiment.

The server, such as 126 in FIG. 1, can include a processor, such as 130, and a computer-readable medium, such as a random access memory (RAM) 132, coupled to the processor 130. The processor, such as 130, can execute computer-executable program instructions stored in memory, such as 132. Computer executable program instructions stored in memory, such as 132, can include any number of module application programs, such as a consumer interaction engine or module similar to 114. The consumer interaction engine or module similar to 114 can be adapted to implement various methods for consumer-interaction. In addition, a consumer interaction engine or module similar to 114 can be adapted to interact with one or more consumers, and one or more servers or data processing resources. Other examples of functionality and aspects of embodiments of a consumer interaction engine or module similar to 114 are described below.

Through the network, such as 104 in FIG. 1, some or all of the product dispensers, such as 102A-102N, can retrieve, receive, or otherwise access information stored in some or all of the databases, such as a recipes, formulations, and methods of making products or beverages database, such as 128A, operational database, such as 128B, and consumer database, such as 128C. In any instance, one or more of the databases can include product or beverage formation information such as one or more product or beverage recipes, formulations, and methods of making products or beverages. Such product or beverage recipes, formulations, and methods of making products or beverages can include an ingredient list, the ratio of each ingredient, a listing of how a product or beverage can be customized by a consumer, and/or other types and kinds of product or beverage recipes, formulations, and methods of making a product or beverage as may be required and/or desired by a particular embodiment.

The example environment or system, such as 100 shown in FIG. 1, can facilitate customer, consumer, and user interaction with a product dispenser and network. For example and not as a limitation, a user such as a consumer can make a product or beverage type selection at a product dispenser, such as 102A, by way of an input/output device, such as display device 112. An associated processor or controller, such as 106, can facilitate a user's selection via display device, such as 112, of a particular recipe to form a selected product, such as a beverage. The processor or controller, such as 106, can display one or more products or beverages for selection via the display device, such as 112. The user may select at least one of the products or beverages using the display device, such as 112, for instance, pressing a button provided by or associated with the display device, such as 112. The processor or controller, such as 106, may obtain from a local memory, such as 110, or may communicate via a network, such as 104, with at least one database, or may communicate with at least one data processing resource, such as server 126, to obtain corresponding ingredients and/or ratio of ingredients for forming the selected product or beverage. The processor or controller, such as 106, can utilize the information to operate one or more pumps, such as 120 and/or valves, such as 122, to form and dispense a product or beverage by way of a nozzle, such as 124, into a cup or other container, such as 136.

In another example, a user such as a customer or package installation personnel can facilitate scanning or reading one or more product ingredient packages, such as 116A-116Q, when the packages 116A-116Q are inserted within an ingredient matrix, such as 108, associated with a product dispenser, such as 102A. A processor or controller, such as 106, associated with the product dispenser, such as 102A, can identify an optimum or selected location within the ingredient matrix, such as 108. The user, customer, or package installation personnel can be informed where a particular product ingredient package, such as 116A, is to be located in the ingredient matrix, such as 108, by way of an input/output device, such as display device, such as 112. An example of a display device can include, but is not limited to, a light emitting diode (LED) display indicator, LCD screen, input/output (I/O) interface, audio interface or other types and kinds of displays or indicators as may be required and/or desired in a particular embodiment.

In one embodiment, insertion of a particular product ingredient package, such as 116A, within an ingredient matrix, such as 108, can be checked or otherwise verified by scanning a machine readable code on the respective package, such as 116A, and scanning a machine readable code located on the ingredient matrix, such as 108, at the point of insertion (illustrated as 118A). In this regard, an associated processor or controller, such as 106, can check or verify that the product ingredient package, such as 116A, is correctly located within the ingredient matrix, such as 108.

In another embodiment, a cup, such as 136, or other container can include identification information, such as a RFID or other machine readable tag, such as 138, mounted to the cup as shown in FIG. 1. In some embodiments, identification information can be associated with a consumer by way of, for instance, RFID or other machine readable tag, similar to 138, embodied in or otherwise mounted to an icon or other object. A reader, such as a RFID or other machine readable code reader, such as 140, associated with a product dispenser, such as 102A, can receive or otherwise obtain the identification information from the RFID or other machine readable tag, similar to 138. As shown in FIG. 1, a processor or controller, such as 106, associated with the product dispenser, such as 102A, can be in communication with the RFID or other machine readable code reader, such as 140, and some or all identification information obtained from the RFID or other machine readable tag, such as 138, can be stored or otherwise processed by the processor or controller, such as 106. In this embodiment, the identification information can be embodied in a machine readable code, a bar code, RFID, radio frequency, infrared, or other wireless communication methods or devices, or other types and kinds of coding and/or storage technologies as may be required and/or desired in a particular embodiment. The RFID reader or machine readable code reader, such as 140, can be a corresponding device to read or receive the identification information from the RFID or other machine readable tag, such as 138, and can include a RFID read/write device, an infrared device, a magnetic card reader, a bar code reader, or other suitable reader or receiver technologies as may be required and/or desired in a particular embodiment.

In yet another embodiment, a server or transaction processing resource, such as 126, can facilitate a payment or payment processing when a consumer selects and attempts to pay for a product, such as a beverage, at a product dispenser, such as 102A. An associated processor or controller, such as 106, can receive the consumer's payment or related information by way of, for instance, a display device, such as 112, data transmission, or other input, before, during, or after the selection of the particular product or beverage. In any instance, the processor or controller, such as 106, can transmit the payment or related information to the server or transaction processing resource, such as 126, via a network, such as 104. The server or transaction processing resource, such as 126, may access least one database, such as 128A-128C, or may communicate with at least one other data processing resource to authorize or otherwise validate a payment or related information prior to accepting a payment from the consumer or otherwise dispensing the selected product or beverage to the consumer.

Figure 2:
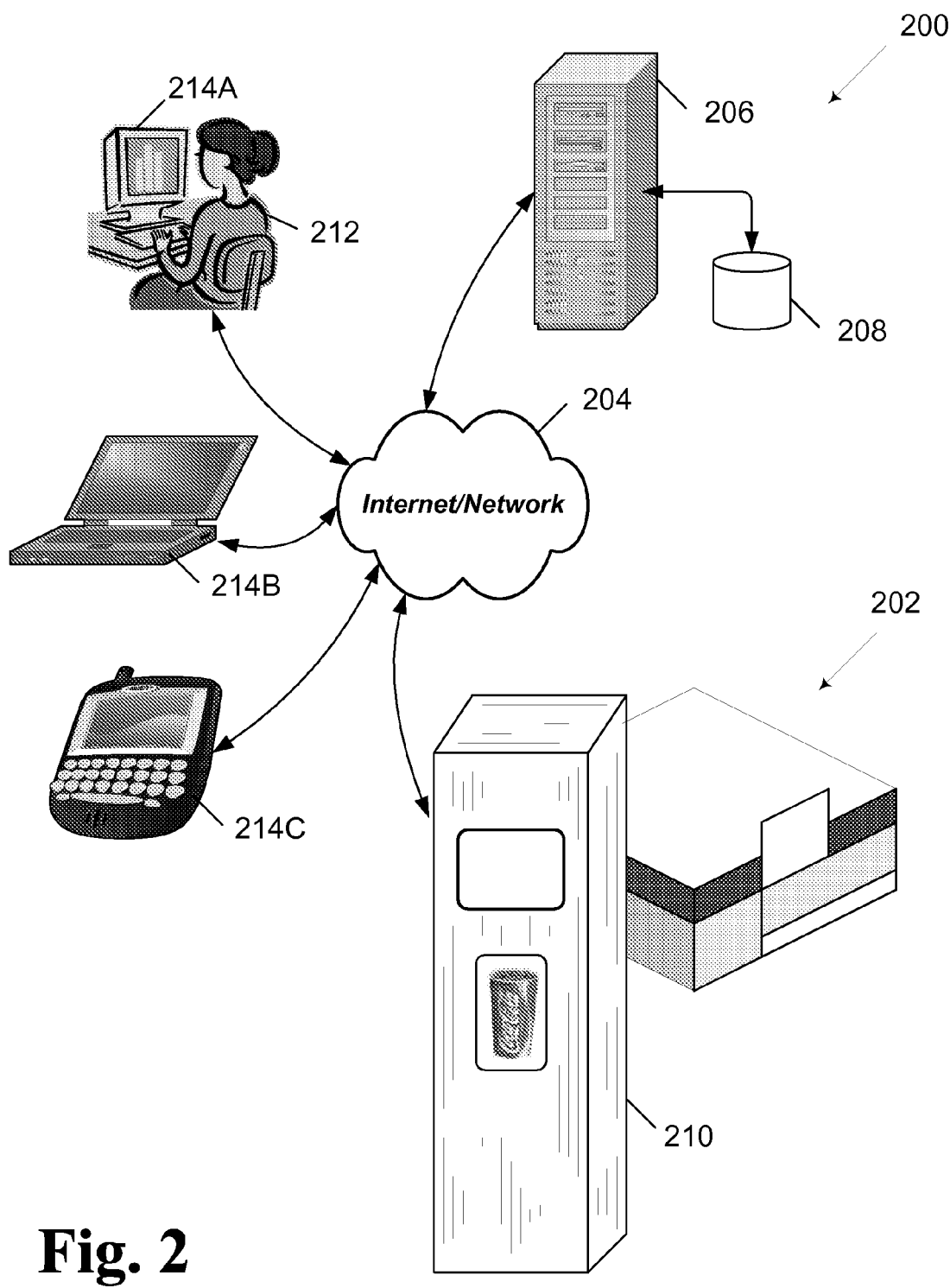
FIG. 2 illustrates one example of a consumer refreshment network in accordance with an embodiment of the invention.

Referring to FIG. 2, an example consumer refreshment environment or system 200 is illustrated. In one embodiment, one or more networked product dispensers, such as 210, can be installed in a plurality of respective locations, such as location 202, and can be in communication via a network 204, such as the Internet or a global network, with one or more servers or data processing resources, such as 206, and one or more data storage devices, such as database 208. By way of example, a product dispenser 210 can be similar to a beverage dispenser or dispenser apparatus, described as 102A in FIG. 1. In one example, a product dispenser, such as 210, can include some or all of the following components as described with respect to FIG. 1: an ingredient matrix, such as 108, with locations operable to receive one or more product ingredient packages, such as 116A-116Q, a controller, such as 106, one or more package insertion detection devices or RFID reader/writer, such as 118A-118Q, pumps, such as 120, valves, such as 122, and a nozzle, such as 124. By way of further example, servers or data processing resources 206 can be similar to server or data processing resource described as 126 in FIG. 1.

In one embodiment, one or more consumers, such as 212, can access a network, such as 104, or a consumer refreshment network, such as 204. Through the network 204, a consumer, such as 212, can sign up, configure consumer preferences, access respective accounts, receive promotions, manage loyalty accounts, and/or sign up for other types and kinds of opportunities and services as may be required and or desired in a particular embodiment. In at least one embodiment, a consumer, such as 212, can choose to access a network 104, or a consumer refreshment network system, such as 200, and/or the product dispenser, such as 210, by way of any number of client-type devices, including, but not limited to, a personal computer (PC), such as 214A, a data processing device, such as 214B, a wireless communication device, such as 214C, and/or by way of other types and kinds of data processing, processor-based, or client-type devices. An example of a wireless communication device can include, but is not limited to, a wireless data processing device, a wireless phone, a mobile phone, an IPHONE™, an IPOD™, personal data assistant, and/or POCKET PC™.

Figure 3:
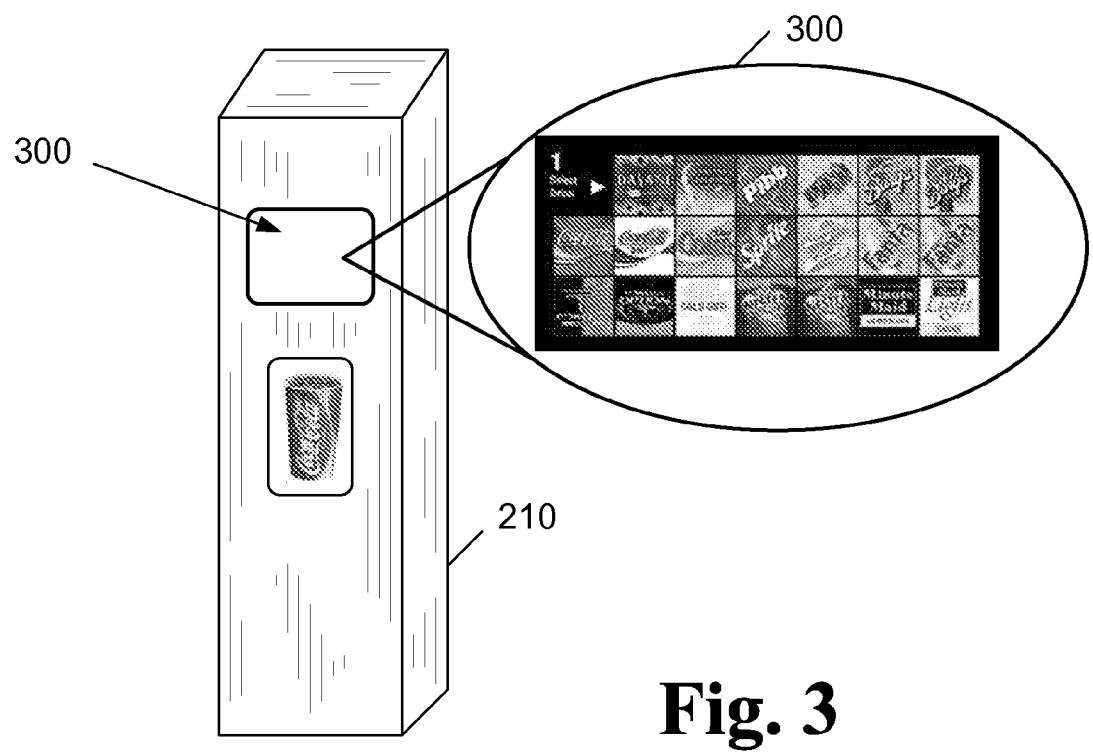
FIG. 3 illustrates one example of an enhanced view graphical user interface in accordance with an embodiment of the invention.

Referring to FIG. 3, an example of an enhanced view graphical user interface 300 is illustrated. In one embodiment shown, a product dispenser, such as 210 in FIG. 2, can include at least one user interface such as an enhanced view graphical user interface, such as 300, or a consumer interface. The user interface, such as 300, can be used, for instance, by a consumer, such as 212, to select any number of different product or beverage types, kinds, and formulations. In use, a product dispenser, such as 210, with an enhanced view graphical user interface, such as 300, can provide a consumer with selectable product or beverage options in a series of dynamically generated menus, wherein the consumer can locate and select a specific brand, kind, type, and/or formulation of a desired corresponding product or beverage. Once a particular product or beverage option is selected, the consumer can cause a corresponding product or beverage to be formulated and dispensed by the product dispenser.

Figure 4:
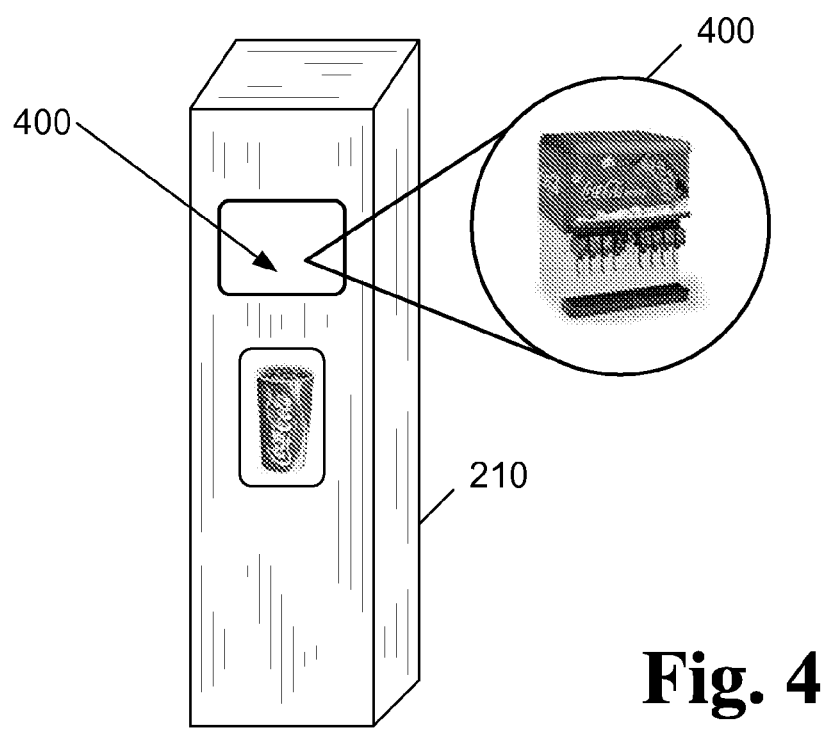
FIG. 4 illustrates one example of a classic view graphical user interface in accordance with an embodiment of the invention.

Referring to FIG. 4, another example of a user interface is shown. In one embodiment, a product dispenser, such as 210 in FIG. 2, can include a classic view graphical user interface, such as 400. The user interface, such as 400, can be used by a consumer, such as 212, to select from a limited number of different product or beverage types, kinds, and/or formulations. In use, a consumer, such as 212, can more easily select a product or beverage from a. limited number of product or beverage choices. Once a particular product or beverage option is selected, the consumer can cause a corresponding product or beverage to be formulated and dispensed by the product dispenser. In some embodiments, a classic type graphical user interface can also be referred to as a traditional view as it generally resembles a traditional fountain dispensing valve design. As such, a classic type graphical user interface can be referred to as a traditional view graphical user interface.

In one embodiment, a consumer may desire fewer product or beverage choices than displayed by a product dispenser that allows the selection of, for instance, a plurality of different kinds of products or beverages. In such instances, a classic view graphical user interface with relatively fewer, more traditional product or beverage choices, and including one or more traditional-type product or beverage choices, can be displayed to facilitate, sometimes quicker, consumer interaction with the product dispenser.

In another embodiment, a consumer may elect to create consumer preferences that tailor the types and/or kinds of brands and/or product or beverage formulations displayed in a user interface, such as a classic view graphical user interface, essentially creating a consumer customized classic view graphical user interface. In this particular embodiment, a consumer can create a consumer customized classic view graphical user interface. For example, when a consumer identifies himself or herself to a product dispenser, such as 210, one or more consumer preferences can be retrieved by the product dispenser 210. Based at least in part on one or more consumer preferences, the product dispenser 210 can display a default user interface to the consumer, which may be an enhanced view graphical user interface, a classic view graphical user interface, or a consumer customized classic view graphical user interface.

FIGS. 5-14 are example flowcharts for various methods in accordance with embodiments of the invention. Some or all of the illustrated methods can be implemented by a system, network, product dispenser, or any combination of associated components as shown in FIGS. 1-4.

Referring to FIGS. 5-6, example methods 500, 600 of consumer—dispenser interactions are illustrated. In the embodiment shown in FIG. 5, a product dispenser can allow a consumer to select product formulation and portion size, and the dispenser can effectuate a promotional offer. The method 500 begins at block 502. In block 502, an input is received from the consumer to select a product formulation at a product dispenser. In the embodiment shown in FIG. 5, a consumer can enter data via a user interface, such as 112 in FIG. 1, such as selection of an indicator corresponding to a product formulation, such as DIET CHERRY COKE™. In other embodiments, other products or product formulations can be selected by a consumer, or other data associated with one or more product selections or formulations can be entered by a consumer. For example, a consumer can enter data corresponding to one or product ingredients, such as a sweetener, vitamins, or other components of a product formulation. In one embodiment, a product selection can be effectuated by way of a graphical user interface associated with a product dispenser.

Block 502 is followed by block 504, in which an input is received from the consumer to select a portion size. In the embodiment shown, a consumer can enter data via a user interface, such as 112 in FIG. 1, such as selection of an indicator corresponding to a portion size, such as 10 fluid ounces. A portion size selection can include, but is not limited to, any number of fluid ounces, by product size description such as child, small, medium, large, super size, and/or by other methods, as may be required and/or desired in a particular embodiment. In other embodiments, other portion sizes can be selected by a consumer, or other data associated with one or more portion sizes can be entered by a consumer.

Block 504 is followed by block 506, in which an input is received from the consumer for payment for the selected product. In the embodiment shown, a processor or controller, such as 106, in FIG. 1, associated with the product dispenser, such as 102A, can prompt the consumer to pay for the selected product. For example, the processor or controller, such as 106, can prompt the consumer to pay via any monetary or financial transaction device or method, such as receiving a credit or debit card or account number. A payment for a selected product can be by way of cashless or currency based transaction. In one embodiment, an option can be provided to a consumer to pay for the product via a client-type device or a wireless communication device, such as 214A-214C in FIG. 2. In this particular embodiment, the consumer can pay for the selected product by authorizing payment via the client-type device or a wireless communication device, such as 214A-214C, and the payment can be received via an associated network, such as 104. In any instance, the consumer is allowed to pay for the selected product.

Block 506 is followed by block 508, in which the product is dispensed. In the embodiment shown, a processor or controller, such as 106 in FIG. 1, associated with the product dispenser, such as 102A, can allow the consumer to dispense a desired product.

The method 500 ends after block 508.

In one embodiment, a consumer can select a product formulation and portion size, and a promotional offer can be effectuated. For example, a consumer can select a product formulation and a portion size, wherein the portion size is the volume (typically small, medium, or large) the consumer desires. The consumer can then be allowed to pay for the product.

In another embodiment, in addition to allowing the consumer to select product formulation and portion size, a promotional offer can be offered to the consumer based in part on their selections. In this regard, the consumer may be offered an option to increase the size of the product they desire, or change the formulation selected to a new formulation.

FIG. 6 illustrates another method 600 for consumer-dispenser interaction. The method 600 begins at block 602. In block 602, an input is received from a consumer to select a product formulation at a product dispenser. In the embodiment shown in FIG. 6, a consumer can enter data via a user interface, such as 112 in FIG. 1, such as selection of an indicator corresponding to a product formulation, such as DIET CHERRY COKE™. In other embodiments, other products or product formulations can be selected by a consumer, or other data associated with one or more product selections or formulations can be entered by a consumer. For example, a consumer can enter data corresponding to one or more product ingredients, such as a sweetener, vitamins, or other components of a product formulation. In one embodiment, a product selection can be effectuated by way of a graphical user interface associated with a product dispenser.

Block 602 is followed by block 604, in which an input is received from the consumer to select the portion size. In the embodiment shown, a consumer can enter data via a user interface, such as 112 in FIG. 1, such as selection of an indicator corresponding to a portion size, such as 10 fluid ounces. A portion size selection can include, but is not limited to, any number of fluid ounces, by product size description such as child, small, medium, large, super size, and/or by other methods, as may be required and/or desired in a particular embodiment. In other embodiments, other portion sizes can be selected by a consumer, or other data associated with one or more portion sizes can be entered by a consumer.

Block 604 is followed by block 606, in which the consumer is prompted with a promotional offer based at least in part on the product selected and/or the portion size selected. In the embodiment shown, a processor or controller, such as 106 in FIG. 1, associated with the product dispenser, such as 102A, can generate or otherwise transmit a communication to the consumer that prompts the consumer with a promotional offer based in part on the product selected and/or the portion size selected. For example, a processor or controller, such as 106, can provide the message and associated prompt to the consumer via an output device, such as a user interface, for instance, such as 112. In another embodiment, a local and/or remote server or data processing resource, such as 126, can generate a communication or other output, such as a message, and transmit the message to the product dispenser, such as 102A, for communication to the consumer. The processor or controller, such as 106, associated with the product dispenser, such as 102A, can receive the message for communication to the consumer. In any instance, the consumer is prompted with a promotional offer based in part on the product selected and/or the portion size selected.

Block 606 is followed by decision block 608, in which a determination is made whether the consumer accepts the promotional offer. If the determination is in the affirmative, that is, the consumer accepts the promotional offer, then the method 600 continues at block 610. If the determination is in the negative, that is, the consumer does not accept the promotional offer, then the method 600 continues at block 612. In the embodiment shown, a processor or controller, such as 106 in FIG. 1, associated with the product dispenser, such as 102A, can determine whether the consumer accepts the promotional offer. For example, the processor or controller, such as 106, can receive a consumer input or selection via a user interface, such as 112, and determine whether the input or selection corresponds to whether the consumer accepts the promotional offer.

In block 610, the product type and/or kind of formulation and/or the portion size of the product is adjusted based on the promotional offer accepted by the consumer. In the embodiment shown, a processor or controller, such as 106 in FIG. 1, associated with the product dispenser, such as 102A, can adjust the product type and/or kind of formulation and/or the portion size of the product based at least in part on the promotional offer accepted by the consumer.

Block 610 is followed by block 612, which is described in detail below.

In block 612, an input is received from the consumer for payment for the selected product. In the embodiment shown, a processor or controller, such as 106 in FIG. 1, associated with the product dispenser, such as 102A, can prompt the consumer to pay for the selected product. For example, the processor or controller, such as 106, can prompt the consumer to pay via any monetary or financial transaction device or method, such as receiving a credit or debit card or account number. A payment for a selected product can be by way of cashless or currency based transaction. In one embodiment, an option can be provided to a consumer to pay for the product via a client-type device or a wireless communication device, such as 214A-214C in FIG. 2. In this particular embodiment, the consumer can pay for the selected product by authorizing payment via the client-type device or a wireless communication device, such as 214A-214C, and the payment can be received via an associated network, such as 104. In any instance, the consumer is allowed to pay for the selected product.

Block 612 is followed by block 614, in which the price is adjusted based on the promotional offer accepted by the consumer. In the embodiment shown, a processor or controller, such as 106 in FIG. 1, associated with the product dispenser 102A, can adjust the price for the selected product based at least in part on the promotional offer accepted by the consumer.

Block 614 is followed by block 616, in which the product is dispensed. In the embodiment shown, a processor or controller, such as 106 in FIG. 1, associated with the product dispenser, such as 102A, can allow the consumer to dispense a desired product.

The method 600 ends after block 616.

In one embodiment, once a consumer makes the selection of product formulation and portion size, a promotional offer based on the consumer's selections can be determined. In this regard, the consumer can be prompted with a promotional offer to solicit a response from the consumer prior to allowing the product to be dispensed. Such promotions can include, but are not limited to, a promotion to increase the portions, change the product formulation selected and/or for other types and/or kinds of promotions, as may be required and or desired in a particular embodiment.

Referring to FIG. 7, one example method 700 of scanning a machine readable icon to configure a product dispenser is provided. The method 700 begins in block 702, in which a machine readable item or icon is read or scanned. In this embodiment, a consumer can scan a machine readable item or icon in the proximity to a product dispenser, such as 102A in FIG. 1, which can be configured to detect the presence of or otherwise receive information associated with the presence of the machine readable item or icon. A machine readable item or icon can include any number of wireless technologies including, but not limited to, RFID, radio frequency, infrared, or other wireless communication methods as may be required and/or desired in a particular embodiment. A machine readable item or icon can be located on, for example, product packaging, a print ad, RFID tag, wireless data processing device, and/or on other types and/or kinds of items, as may be required and or desired in a particular embodiment.

Block 702 is followed by block 704, in which the product dispenser is configured based in part on the information associated with the scanned or read machine readable item or icon. In this embodiment, a processor or controller associated with a product dispenser, such as controller 106 in FIG. 1, can receive or otherwise obtain information associated with a machine readable item or icon. Based at least in part on the information associated with a machine readable item or icon, the processor or controller, such as 106, the product dispenser, such as 102A, can configure one or more dispenser parameters. Dispenser parameters can include, but are not limited to, product type, kind, portion size, and price, such as a free drink.

Block 704 is followed by block 706, in which the product type and/or kind, portion size, and/or price are set. In this embodiment, a processor or controller associated with a product dispenser, such as controller 106 in FIG. 1, can set one or more dispenser parameters for dispensing a product.

Block 706 is followed by block 708, in which an input is optionally received from the consumer to for payment for the product. In the embodiment shown, a processor or controller, such as 106 in FIG. 1, associated with the product dispenser, such as 102A, can prompt the consumer to purchase the product. For example, the processor or controller, such as 106, can prompt the consumer to pay via any monetary or financial transaction device or method, such as receiving a credit or debit card or account number. A payment for a selected product can be by way of cashless or currency based transaction. In one embodiment, an option can be provided to a consumer to purchase the product via a client-type device or a wireless communication device, such as 214A-214C in FIG. 2. In this particular embodiment, the consumer can pay for the selected product by authorizing payment via the client-type device or a wireless communication device, such as 214A-214C, and the payment can be received via an associated network, such as 104. In any instance, the consumer is allowed to purchase the product.

Block 708 is followed by block 710, in which the product is dispensed. In the embodiment shown, a processor or controller, such as 106 in FIG. 1, associated with the product dispenser, such as 102A, can allow the consumer to dispense the product.

The method 700 ends after block 710.

In one embodiment, a machine readable item or icon can be located on product packaging, in a print ad, or associated with other objects which may be carried by or otherwise obtained by a consumer. In this regard, a suitable machine readable item or icon can be a barcode or other machine readable code. In addition, a suitable machine readable item or icon can be a RFID tag or other device capable of wirelessly data communicating with the product dispenser. In operation, the consumer can scan a machine readable item or icon at a product dispenser. The product dispenser can then automatically configure itself to dispense a particular product associated with or otherwise referred to by the machine readable item or icon.

In one embodiment, a consumer can scan a print ad, containing a machine readable item or icon from a magazine, at a product dispenser. The machine readable item or icon can instruct the product dispenser to dispense a certain product formulation to the consumer. Such machine readable items or icons can be used in promotions, such as trying an ad campaign touting a new product formulation which can be obtained for free or at a discounted price. In addition, a machine readable item or icon can be used to accelerate or otherwise facilitate a consumer selection at a product dispenser. In this regard, a consumer need only scan the machine readable item or icon to facilitate the preparation and dispensing of a particular product at the product dispenser.

Referring to FIG. 8, one example method 800 of consumer-dispenser interaction is illustrated. The method 800 begins in block 802. In block 802, an input is received from a consumer for at least one product. In this embodiment, a consumer can place an order for at least one product at an order station. An order station can be located at a register at a quick serve restaurant, a convenience store check out aisle, and/or at other types and/or kinds of order stations as may be required and or desired in a particular embodiment. For example, an order station can be configured with at least one client-type device or wireless communication device, such as 214A-214C in FIG. 2, to receive an order for at least one product. A consumer or personnel associated with an order station can input data corresponding to the order for the at least one product via the client-type device or wireless communication device, such as 214A-214C.

Block 802 is followed by block 804, in which a machine readable icon or item is provided to the consumer. During or after the order is submitted, at least one machine readable icon or item can be provided or otherwise obtained by the consumer. A machine readable icon or item can include, but is not limited to, a receipt with a barcode or other machine readable code, an RFID tagged item, an item associated with an RFID tag, an item with a wireless communication device, and/or other types of items with associated wireless communication devices. A machine readable icon or item can include any number of wireless technologies including, but not limited to, RFID, radio frequency, infrared, or other wireless communication methods as may be required and/or desired in a particular embodiment.

Block 804 is followed by block 806, in which the consumer scans the machine readable icon or item at a product dispenser. In this embodiment, a consumer can scan a machine readable icon or item in proximity to a product dispenser, such as 102A, which can be configured to detect the presence of or otherwise receive information associated with the presence of the machine readable icon or item. For example, a product dispenser can be configured to include an RFID read/write device, such as the identification reader/scanner device 106A, capable of detecting the presence of or otherwise receive information associated with the presence of a machine readable icon or item associated with an RFID tag. In any instance, the machine readable icon or item can include data which can be received by the product dispenser when the machine readable icon or item is scanned or read at the product dispenser.

Block 806 is followed by block 808, in which the product dispenser obtains the consumer's order. In this embodiment, a processor or controller, such as 106 in FIG. 1, associated with a product dispenser, such as 102A, can communicate with a local and/or remote processor, controller, server, or data processing resource, such as 126, memory, or data storage device, such as 110, to obtain information regarding the consumer order based at least in part on the data obtained from scanning the machine readable icon or item. Data obtaining from scanning the machine readable icon or item can include, but is not limited to, product type information, product identification information, and other information associated with the product and/or item. For example, when a product dispenser, such as 102A, receives data obtained from scanning the machine readable icon or item, an associated processor or controller, such as 106, can access an associated memory or data storage device, such as 106, to obtain information associated with the consumer's order. In another example, a local and/or remote processor, controller, server, or data processing resource, such as 126, can access an associated memory or data storage device, such as 110, to obtain information associated with the consumer's order.

Block 808 is followed by decision block 810, in which a determination is made as to whether the consumer is entitled to a product. If the determination is in the affirmative, that is, the consumer is entitled to a product, then the method 800 continues at block 812. If the determination is in the negative that is the consumer is not entitled to a product, then the method 800 ends. In the embodiment shown, a processor or controller, such as 106 in FIG. 1, can determine whether the consumer is entitled to a product. For example, the controller, such as 106, can determine whether the consumer is entitled to a product by obtaining information associated with the consumer order, and determining whether predefined criteria are met, such as whether the consumer order is valid or fully paid for. In one embodiment, a processor or controller, such as 106, can communicate with a local and/or remote server or data processing resource, such as 126, which can determine whether the consumer is entitled to a product. In any instance, a determination is made as to whether the consumer is entitled to a product.

In block 812, the product dispenser is configured to allow the consumer to select and dispense a product. In this embodiment, a processor or controller associated with a product dispenser, such as controller 106 in FIG. 1, can configure one or more dispenser parameters to permit the consumer to select and dispense a product. Dispenser parameters can include, but are not limited to, product type, kind, product formulation, portion size, and price. For example, a consumer can be allowed to select the product formulation, and optionally the portion size via a user interface associated with the product dispenser, such as user interface, such as 112. In some instances, the product dispenser can permit the consumer to set a price, or the price may be dependent on any of the consumer selected dispenser parameters such as product type, kind, product formulation, or portion size.

Block 812 is followed by block 814, in which the product is dispensed. In the embodiment shown, a processor or controller, such as 106 in FIG. 1, associated with the product dispenser, such as 102A, can allow the consumer to dispense the product.

In block 816, the product dispenser updates consumer's order indicating dispensed product status. In the embodiment shown, a processor or controller, such as 106 in FIG. 1, associated with the product dispenser, such as 102A, can update a consumer's order indicating dispensed product status. For example, a consumer order can be updated such that the status of the order can reflect changes or new data associated with a dispensed product including, but not limited to, type or kind of product, portion size, and price. In one embodiment, a local and/or remote server or data processing resource, such as 126, can update a consumer's order indicating dispensed product status. In one embodiment, a product dispenser can update the consumer's order indicating that a product has been dispensed. Additionally, any status, configuration, product formulation, portion size, price, and/or other types and/or kinds of information and other data can be communicated and updated, as may be required and/or desired in a particular embodiment. In any instance, the product dispenser data can communicate to update a consumer's order indicating dispensed product status.

The method 800 ends after block 816.

In one embodiment, a consumer can place an order that includes a product at a counter or other place. The consumer can be presented with a receipt or other item that indicates in a printed or electronic manner that the consumer is entitled to a product. The consumer can then scan the receipt or other item at a product dispenser. Information regarding the consumer's order can then be obtained and if the consumer is entitled to a product, the consumer can then select and dispense a product.

Figure 9:
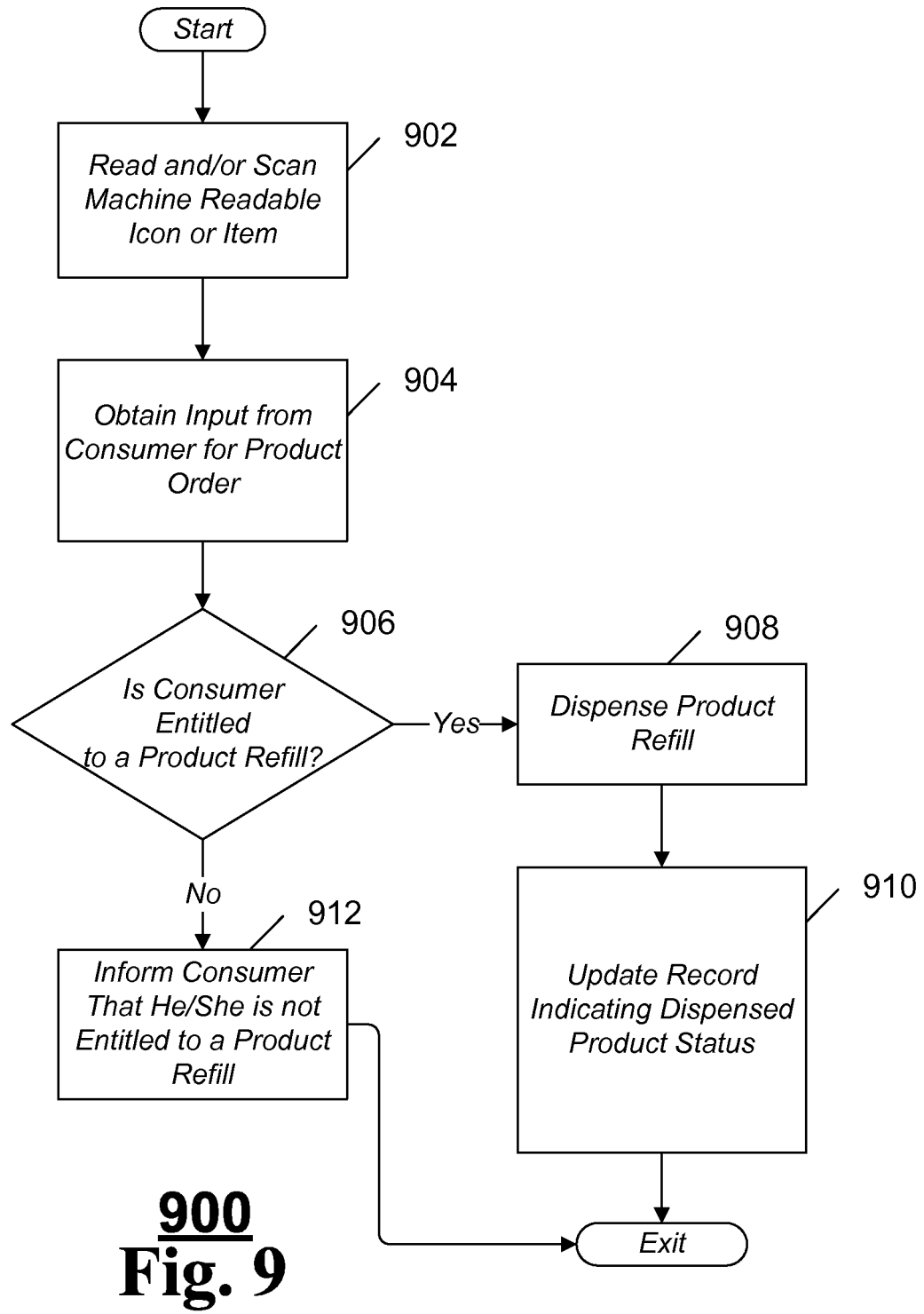
FIG. 9 illustrates one example method of limiting the number of product refills in accordance with an embodiment of the invention.

FIG. 9 illustrates an example method 900 for limiting a number of product refills is illustrated. The method 900 begins at block 902. In block 902, a machine readable icon or item is read and/or scanned at a product dispenser. In this embodiment, a consumer can scan a machine readable icon or item in proximity to a product dispenser, such as 102A, which can be configured to detect the presence of or otherwise receive information associated with the presence of the machine readable icon or item. For example, a product dispenser, such as 102A, can be configured to include a RFID read/write device, such an identification reader/scanner device 106A, capable of detect the presence of or otherwise receive information associated with the presence of a machine readable icon or item associated with a RFID tag. In any instance, the machine readable icon or item can include data which can be received by the product dispenser when the machine readable icon or item is scanned.

In one embodiment, a machine readable icon or item can be obtained from an order station. An order station can be located at a register at a quick serve restaurant, a convenience store check out aisle, and/or at other types and/or kinds of order stations as may be required and/or desired in a particular embodiment. For example, an order station can be configured with at least one client-type device or wireless communication device, such as 214A-214C in FIG. 2, to receive an order for at least one product. A consumer or personnel associated with an order station can input data corresponding to the order for the at least one product via the client-type device or wireless communication device, such as 214A-214C. A machine readable icon or item can include, but is not limited to, a receipt with a barcode or other machine readable code, an RFID tagged item, an item associated with an RFID tag, an item with a wireless communication device, and/or other types of items with associated wireless communication devices. A machine readable icon or item can include any number of wireless technologies including, but not limited to, RFID, radio frequency, infrared, or other wireless communication methods as may be required and/or desired in a particular embodiment.

Block 902 is followed by block 904, in which the product dispenser obtains a consumer order. In this embodiment, a processor or controller, such as 106 in FIG. 1, associated with a product dispenser, such as 102A, can communicate with a local and/or remote processor, controller, server, or data processing resource, such as 126, memory, or data storage device, such as 110, to obtain information regarding the consumer order based at least in part on the data obtained from scanning the machine readable icon or item. Data obtaining from scanning the machine readable icon or item can include, but is not limited to, product type information, product identification information, and other information associated with the product and/or item. For example, when a product dispenser, such as 102A, receives data obtained from scanning the machine readable icon or item, an associated processor or controller, such as 106, can access an associated memory or data storage device, such as 110, to obtain information associated with the consumer's order. In another example, a local and/or remote processor, controller, server, or data processing resource, such as 126, can access an associated memory or data storage device, such as 110, to obtain information associated with the consumer's order.

Block 904 is followed by decision block 906, in which a determination is made as to whether the consumer is entitled to a refill. If the determination is in the affirmative, that is, the consumer is entitled to a refill, then the method 900 continues at block 908. If the determination is in the negative, that is, the consumer is not entitled to a refill, then the method 900 continues at block 912. In the embodiment shown, a processor or controller, such as 106, can determine whether the consumer is entitled to a product refill. For example, the controller, such as 106, can determine whether the consumer is entitled to a product refill by obtaining information associated with the consumer order, and determining whether predefined criteria are met, such as whether the consumer order includes a product refill or whether the order has been paid in full. In one embodiment, a processor or controller, such as 106, can communicate with a local and/or remote server or data processing resource, such as 126, which can determine whether the consumer is entitled to a product refill. In any instance, a determination is made as to whether the consumer is entitled to a product refill.

In one embodiment, an order station, such as a quick serve restaurant, may have a policy that there are no product refills. As such, when the consumer's order is checked after the product has been initially filled, the determination can be that the consumer is not entitled to a refill.

In another embodiment, an order station, such as a quick serve restaurant, may offer product refills at half price or other discounted price. As such, when the consumer's order is checked after the product has been initially filled, the determination can be to allow the consumer to pay for a product refill.

In another embodiment, an order station, such as a quick serve restaurant, may allow a predefined number of product refills, such as one. As such, when the consumer's order is checked after the product has been initially filled, the determination can be to allow the consumer to dispense a predefined number of product refills, such as one. After the predefined number of product refills has been reached, the determination can be that the consumer is not entitled to additional product refills.

In block 908, a product refill is dispensed. In the embodiment shown, a processor or controller, such as 106 in FIG. 1, associated with the product dispenser, such as 102A, can allow the consumer to dispense a product, such a product refill.

Block 908 is followed by block 910, in which the product dispenser updates the consumer's order indicating a dispensed product status. In the embodiment shown, a processor or controller, such as 106 in FIG. 1, associated with the product dispenser, such as 102A, can update a consumer's order indicating dispensed product refill status. For example, a consumer order can be updated such that the status of the order can reflect changes or new data associated with a dispensed product refill including, but not limited to, type or kind of product, portion size, and price. In one embodiment, a local and/or remote server or data processing resource, such as 126 in FIG. 1, can update a consumer's order indicating dispensed product refill status. In one embodiment, a product dispenser can update the consumer's order indicating that a product refill has been dispensed. Additionally, any status, configuration, product formulation, portion size, price, and/or other types and/or kinds of information and other data can be data communicated and updated, as may be required and/or desired in a particular embodiment. In any instance, the product dispenser data can communicate to update a consumer's order indicating dispensed product refill status.

The method 900 ends after block 910.

Referring to block 912, a consumer is informed that her or she is not entitled to a refill. In the embodiment shown, a processor or controller, such as 106 in FIG. 1, associated with the product dispenser, such as 102A, can inform the consumer that he or she is not entitled to a product refill. For example, after the consumer requests a product refill or the consumer attempts to refill a product, and the consumer is not entitled to a refill, the controller, such as 106, can provide a communication, such as a message via a user interface associated with the product dispenser, such as user interface, such as 112, that the consumer is not entitled to a refill.

The method 900 ends after block 912.

In an example embodiment, a consumer can place an order that includes at least a product at a product station. The consumer can be given a machine readable icon or item. Such a machine readable icon or item can be a receipt with a barcode, a RFID tagged item, a wireless device, and/or other types and/or kinds of machine readable icons or items as may be required and/or desired in a particular embodiment. The consumer can then scan the icon or item at a product dispense to obtain the ordered product. The fulfillment of the order can be tracked and as such, when the consumer desires to refill the product a determination can be made at to whether or not the consumer is entitled to a refill.

In one embodiment, updating a consumer's order can be utilized to prevent or otherwise limit the ability of the consumer from dispensing excessive product refills. In this regard, once a consumer scans a machine readable icon, item or code, dispenses a product, and the consumer's order updated, the consumer can be prevented or otherwise limited from further dispensing a product refill. For example, should the consumer desire a product refill, a product dispenser can prompt the consumer to pay for a refill at, perhaps, a reduced price versus the price for an initial or first time purchase of the product at an order station.

Figure 10:
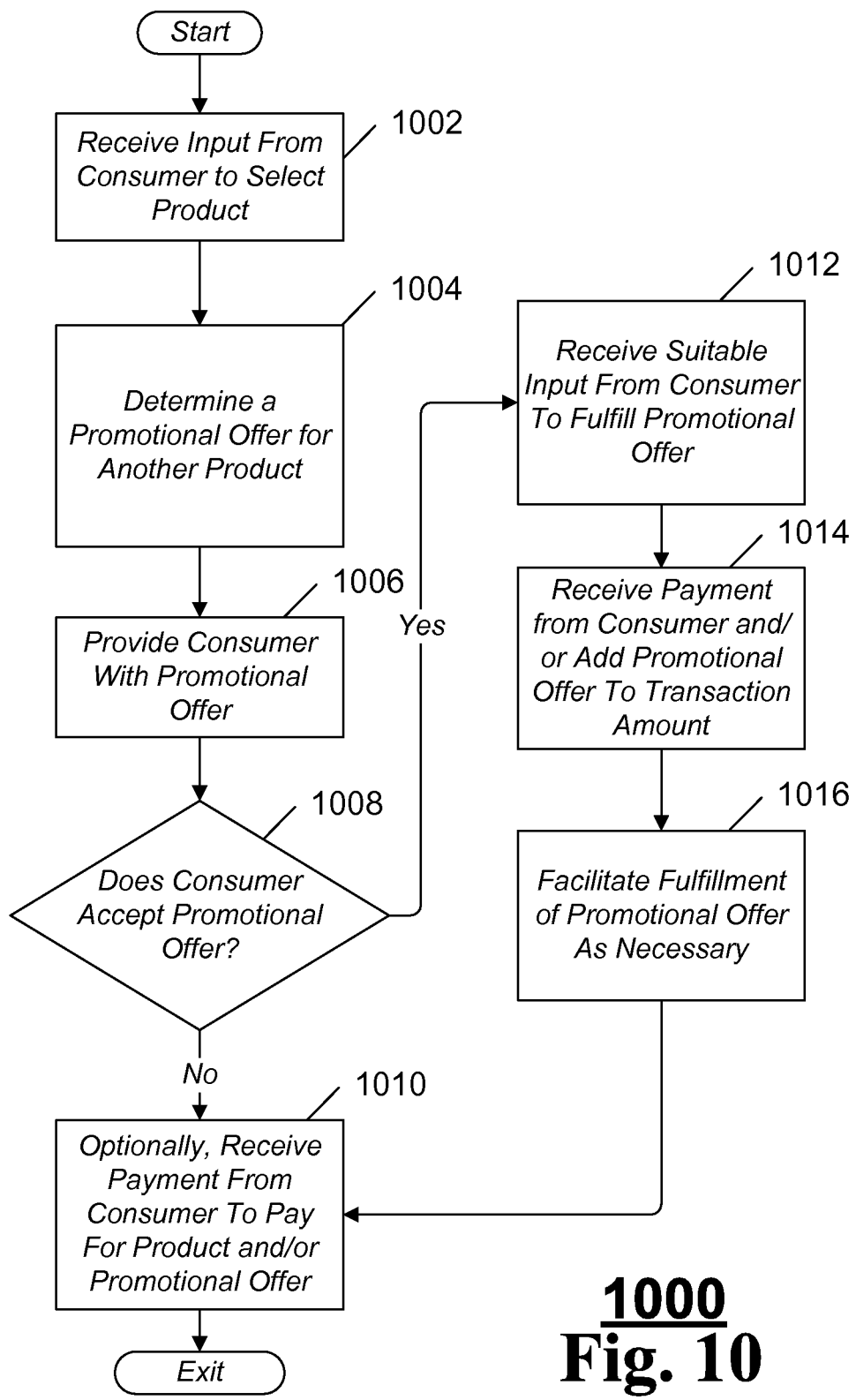
FIG. 10 illustrates one example method of coupling a promotional offer for a phone card and/or a wireless phone with a product transaction in accordance with an embodiment of the invention.

Referring to FIG. 10, an example method 1000 of coupling a promotional offer for a phone card and/or a wireless phone with a product transaction is illustrated. The method 1000 begins in block 1002. In block 1002, an input is received from a consumer to select a product. In the embodiment shown in FIG. 10, a consumer can enter data via a user interface, such as 112 in FIG. 1, such as selection of an indicator corresponding to a product, such as DIET CHERRY COKE™. In other embodiments, other products can be selected by a consumer, or other data associated with one or more product selections can be entered by a consumer. In one embodiment, a product selection can be effectuated by way of a graphical user interface associated with a product dispenser, such as user interface, such as 112.

Block 1002 is followed by block 1004, in which the product dispenser data communicates locally and/or remotely to determine a promotional phone card and/or wireless phone promotional offer. In this embodiment, a processor or controller, such as 106 in FIG. 1, associated with a product dispenser, such as 102A, can communicate with a local and/or remote processor, controller, server, or data processing resource, such as 126, memory, or data storage device, such as 110, to obtain information regarding a promotional phone card and/or wireless phone promotional offer. For example, when a product dispenser, such as 102A, receives data obtained from scanning the machine readable icon or item, an associated processor or controller, such as 106, can access an associated memory or data storage device, such as 110, to obtain information associated with a promotional phone card and/or wireless phone promotional offer. In another example, a local and/or remote processor, controller, server, or data processing resource, such as 126, can access an associated memory or data storage device, such as 110, to obtain information associated with a promotional phone card and/or wireless phone promotional offer.

Block 1004 is followed by block 1006, in which the consumer is provided with a promotional offer. In the embodiment shown, a processor or controller, such as 106 in FIG. 1 associated with the product dispenser, such as 102A, can generate or otherwise transmit a communication to the consumer that prompts the consumer with a promotional offer. For example, the a processor or controller, such as 106, can provide the message and associated prompt to the consumer via an output device, such as a user interface, for instance, such as 112. In another embodiment, a local and/or remote server or data processing resource, such as 126 in FIG. 1, can generate a communication or other output, such as a message, and transmit the message to the product dispenser, such as 102A, for communication to the consumer. The processor or controller, such as 106, associated with the product dispenser, such as 102A, can receive the message for communication to the consumer. In any instance, the consumer is prompted with a promotional offer, for instance, a promotional offer for a phone card and/or wireless phone.

Block 1006 is followed by decision block 1008, in which a determination is made as to whether the consumer accepts the promotional offer. If the determination is in the affirmative, that is, the consumer accepts the promotional offer, then the method 1000 continues at block 1012. If the determination is in the negative, that is, the consumer does not accept the promotional offer, then the method 1000 continues at block 1010. In the embodiment shown, a processor or controller, such as 106 in FIG. 1, associated with the product dispenser, such as 102A, can determine whether the consumer accepts the promotional offer. For example, the processor or controller, such as 106, can receive a consumer input or selection via a user interface, such as 112, and determine whether the input or selection corresponds to whether the consumer accepts the promotional offer.

In block 1010, a suitable input from the consumer is optionally received to pay for the product, and if necessary, for the promotional offer. In the embodiment shown, a processor or controller, such as 106 in FIG. 1, associated with the product dispenser, such as 102A, can prompt the consumer to pay for the product, and if necessary, for the promotional offer. For example, the processor or controller, such as 106, can prompt the consumer to pay via any monetary or financial transaction device or method, such as receiving a credit or debit card or account number. A payment for a product and/or promotional offer can be by way of cashless or currency based transaction. In one embodiment, an option can be provided to a consumer to purchase the product and/or promotional offer via a client-type device or a wireless communication device, such as 214A-214C in FIG. 2. In this particular embodiment, the consumer can pay for the product and/or promotional offer by authorizing payment via the client-type device or a wireless communication device, such as 214A-214C, and the payment can be received via an associated network, such as 104. In any instance, the consumer is allowed to purchase the product and/or promotional offer.

The method 1000 ends after block 1010.

Referring to block 1012, suitable input is received from the consumer to fulfill the promotional offer. In the embodiment shown, a consumer can enter data via a user interface associated with a product dispenser, such as user interface 112 in FIG. 1, including the input of any data necessary to fulfill a promotional offer. For example, data can be input corresponding to a phone card or wireless phone. In one embodiment, a consumer can provide an e-mail address, a wireless phone number, and/or other types and kinds of information, as may be required and/or desired in a particular embodiment in order to fulfill any requirements of a promotional offer.

Block 1012 is followed by block 1014, in which payment is received from the consumer to pay for and/or otherwise add the promotional offer to the transaction amount. In the embodiment shown, a processor or controller, such as 106 in FIG. 1, associated with the product dispenser, such as 102A, can prompt the consumer to pay for and/or otherwise add the promotional offer to the transaction amount. For example, the processor or controller, such as 106, can prompt the consumer to pay via any monetary or financial transaction device or method, such as receiving a credit or debit card or account number. A payment for a selected product and/or promotional offer can be by way of cashless or currency based transaction. In one embodiment, an option can be provided to a consumer to pay for the product and/or promotional offer via a client-type device or a wireless communication device, such as 214A-214C in FIG. 2. In this particular embodiment, the consumer can pay for the selected product and/or promotional offer by authorizing payment via the client-type device or a wireless communication device, such as 214A-214C, and the payment can be received via an associated network, such as 104. In another embodiment, a particular promotional offer may require detailed consumer information, fees, and/or other information, and the consumer can be allowed to pay for some or all of the these fees, or otherwise add the amount to the current transaction and pay after fulfillment of the order. In any instance, the consumer is allowed to pay for the selected product and/or add the promotional offer to the transaction amount.

Block 1014 is followed by block 1016, in which fulfillment of the promotional offer is facilitated as necessary. Depending on the type of promotional offer, some or all of any remaining requirements to fulfill the promotional offer can be facilitated. For example, if a promotional phone card or wireless phone is to be dispensed to the consumer, the processor or controller, such as 106 in FIG. 1, associated with the product dispenser, such as 102A, can facilitate transmission of corresponding instructions to a local and/or remote server or data processing resource, such as 126 in FIG. 1, to facilitate dispensing, routing, or other means necessary to fulfill the promotional offer.

Block 1016 is followed by block 1010, in which is described in detail above.

In one embodiment, a consumer using a product dispenser can be prompted with a promotional offer for a phone card and/or wireless phone offer. For example, the consumer may accept a promotion for free or discounted minutes on a wireless phone plan.

Figure 11:
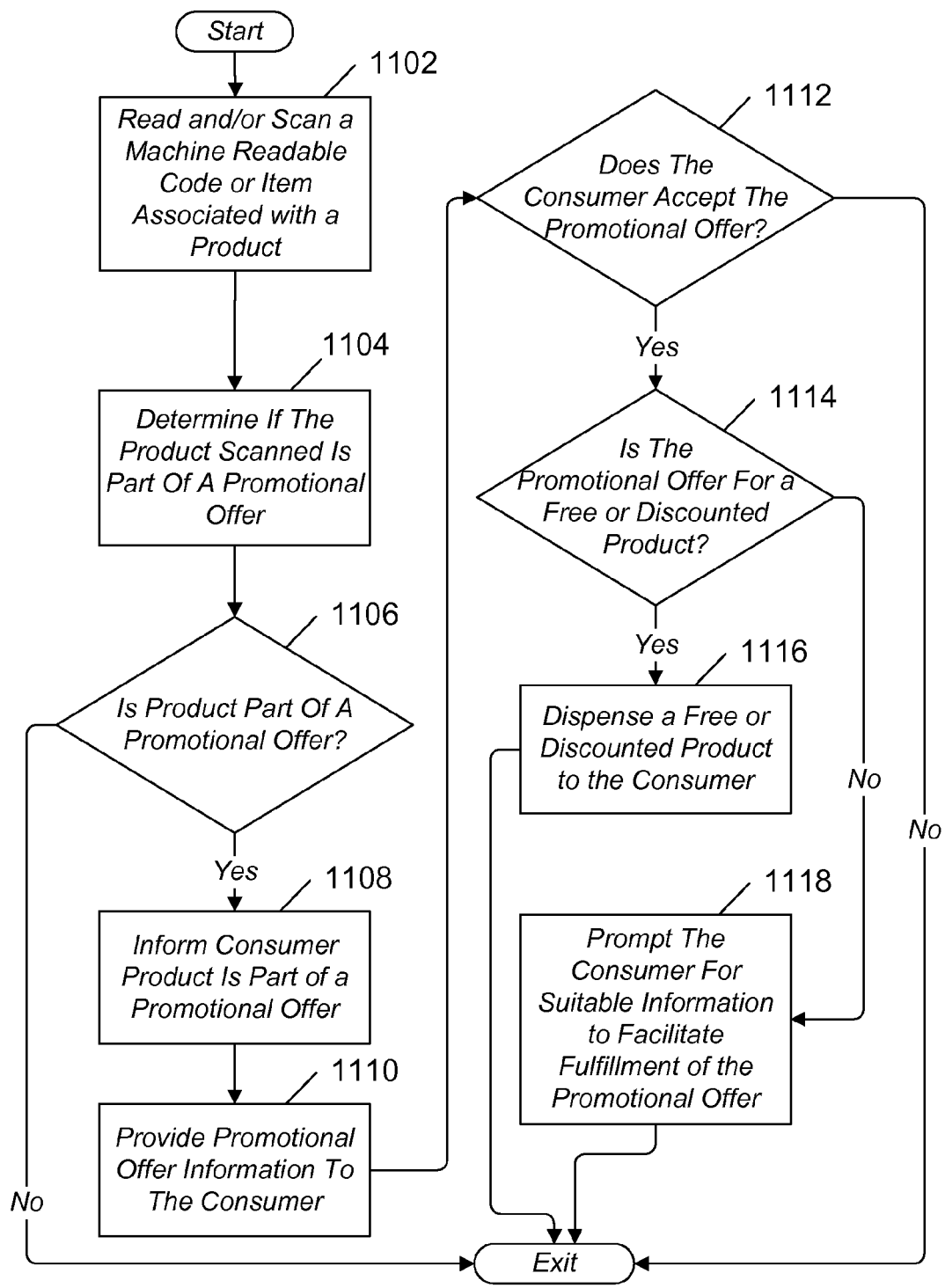
FIG. 11 illustrates one example method of combining a promotional offer associated with a product, with a product from a product dispenser in accordance with an embodiment of the invention.

Referring to FIG. 11, an example method 1100 of combining a promotional offer associated with a product with a product from a product dispenser is illustrated. The method 1100 begins at block 1102. In block 1102, a machine readable code or item associated with a product is scanned or read. In this embodiment, a consumer can scan a product in the proximity to a product dispenser, such as 102A in FIG. 1, which can be configured to detect the presence of or otherwise receive information associated with the presence of the product. A product can include any number of wireless technologies including, but not limited to, RFID, radio frequency, infrared, or other wireless communication methods as may be required and/or desired in a particular embodiment. A product can be, for example, a cup, a box, a tray, a container, or any product packaging as may be required and or desired in a particular embodiment.

Block 1102 is followed by block 1104, in which the product dispenser determines if the product scanned is part of a promotional offer. In one embodiment, a processor or controller, such as 106, can communicate via a network, such as 104, with a local and/or remote server or data processing resource, such as 126, which can determine whether the scanned product is part of a promotional offer.

Block 1104 is followed by decision block 1106, in which a determination is made as to whether the scanned product is part of a promotional offer. If the determination is in the affirmative, that is, the scanned product is part of a promotional offer, then the method 1100 continues at block 1108. If the determination is in the negative, that is, the scanned product is not part of a promotional offer, then the method 1100 ends. In the embodiment shown, a processor or controller, such as 106, can determine whether the scanned product is part of a promotional offer. For example, the controller, such as 106, can determine whether the scanned product is part of a promotional offer by obtaining information associated with the scanned product, and determining whether predefined criteria are met, such as whether the promotional offer covers or otherwise involves the scanned product. In one embodiment, a processor or controller, such as 106, can communicate with a local and/or remote server or data processing resource, such as 126, which can determine whether the scanned product is part of a promotional offer. In any instance, a determination is made as to whether the scanned product is part of a promotional offer.

In block 1108, the consumer is informed that the product is part of a promotional offer. In the embodiment shown, a processor or controller, such as 106 in FIG. 1, associated with the product dispenser, such as 102A, can inform the consumer that the product is part of a promotional offer. For example, after the consumer scans a product in proximity to a product dispenser, such as 102A, the controller, such as 106, can provide a communication, such as a message, via a user interface associated with the product dispenser, such as user interface, such as 112, that the product is part of a promotional offer.

Block 1108 is followed by block 1110, in which the consumer is provided with promotional offer information. In the embodiment shown, a processor or controller, such as 106 in FIG. 1, associated with the product dispenser, such as 102A, can provide promotional offer information or details to the consumer. For example, after the consumer is informed that the product is part of a promotional offer, the controller, such as 106, can provide additional information, such as a message, via a user interface associated with the product dispenser, such as user interface, such as 112.

Block 1110 is followed by decision block 1112, in which a determination is made as to whether the consumer accepts the promotional offer. If the determination is in the affirmative, that is, the consumer accepts the promotional offer, then the method continues to decision block 1114. If the determination is in the negative, that is, the consumer does not accept the promotional offer, then the method 1100 ends. In the embodiment shown, a processor or controller, such as 106 in FIG. 1, associated with the product dispenser, such as 102A, can determine whether the consumer accepts the promotional offer. For example, the processor or controller, such as 106, can receive a consumer input or selection via a user interface, such as 112, and determine whether the input or selection corresponds to whether the consumer accepts the promotional offer.

In decision block 1114, a determination is made as to whether the promotional offer is for a free product. If the determination is in the affirmative, that is, the promotional offer is for a free or discounted product, then the method 1100 continues at block 1116. If the determination is in the negative, that is, the promotional offer is not for a free or discounted product, then the method 1100 continues at block 1118. In the embodiment shown, a processor or controller, such as 106, can determine whether the promotional offer is for a free or discounted product. For example, the controller, such as 106 in FIG. 1, can determine whether the promotional offer includes an offer for a free or discounted product by obtaining information associated with the promotional offer. The controller, such as 106, can determine whether predefined criteria are met, such as whether the promotional offer covers or otherwise involves a free or discounted product. In one embodiment, a processor or controller, such as 106, can communicate with a local and/or remote server or data processing resource, such as 126, which can determine whether the promotional offer includes an offer for a free or discounted product. In any instance, a determination is made as to whether the promotional offer is for a free or discounted product.

In block 1116, a free or discounted product is dispensed to the consumer. In the embodiment shown, a processor or controller, such as 106 in FIG. 1, associated with the product dispenser, such as 102A, can allow the consumer to dispense a free or discounted product.

After block 1116, the method 1100 ends.

Referring to block 1118, the consumer is prompted for suitable information to facilitate fulfillment of the promotional offer. In the embodiment shown, a processor or controller, such as 106 in FIG. 1, can prompt a consumer to input or otherwise provide suitable details to facilitate fulfillment of the promotional offer. A consumer can utilize a user interface associated with a product dispenser, such as user interface, such as 112, to provide details, such as consumer preferences or information, to effectuate or otherwise facilitate the promotional offer fulfillment. The user can input one or more selections via the user interface, such as 112, and the processor or controller, such as 106, can facilitate the promotional offer fulfillment based at least in part on consumer preferences or information provided by the consumer. For example, a consumer can be allowed to pay for and/or otherwise add the promotional offer to the transaction amount. As such, the promotional offer may require or otherwise need detailed consumer information, fees, and/or other data to allow the consumer to pay, add the amount to the current transaction, or to pay after fulfillment of the order.

The method 1100 ends after block 1118.

In one embodiment, a promotional offer between a product and a beverage can be effectuated. In this regard, the product can be scanned at a product dispenser. The offer details can be obtained and the product dispenser can be configure as necessary.

In one embodiment, a promotional offer to buy a candy bar and obtain a product for free or for a discounted price can be effectuated. A consumer can first purchase the candy bar. The candy bar wrapper can be scanned at a product dispenser. The product dispenser can obtain information related to the particular offer and determine that a free or discounted product should be dispensed. The consumer can be allowed to dispense a product, such as a beverage.

In another embodiment, one or more promotions can be effectuated to offer a free or discounted product, specific types and/or kinds of products, and/or for other offers, as may be required and/or desired in a particular embodiment.

Referring to FIG. 12, an example method 1200 of dispensing free or discounted products to a consumer while the consumer is paying for Internet or network access is illustrated. The method 1200 begins in block 1202. In block 1202, an input is received from a consumer to open a transaction and pay for network or Internet access by way of a product dispenser. In the embodiment shown, a processor or controller, such as 106 in FIG. 1, associated with the product dispenser, such as 102A, can permit a consumer to initiate a transaction and pay for network or Internet access or service. For example, the processor or controller, such as 106, can prompt the consumer to pay via any monetary or financial transaction device or method, such as receiving a credit or debit card or account number. A payment for network or Internet access or service can be by way of cashless or currency based transaction. In one embodiment, an option can be provided to a consumer to pay for network or Internet access or service via a client-type device or a wireless communication device, such as 214A-214C in FIG. 2. In this particular embodiment, the consumer can pay for network or Internet access or service by authorizing payment via the client-type device or a wireless communication device, such as 214A-214C, and the payment can be received via an associated network, such as 104. In any instance, the consumer is allowed to open a transaction and pay for Internet access by way of a product dispenser.

Block 1202 is followed by decision block 1204, in which a determination is made as to whether the consumer wants to dispense a product. If the determination is in the affirmative, that is, the consumer wants to dispense a product, then the method 1200 continues to block 1206. If the determination is in the negative, that is, the consumer does not want to dispense a product, then the method continues at decision block 1208. In the embodiment shown, a processor or controller, such as 106 in FIG. 1, associated with the product dispenser, such as 102A, can allow the consumer to select a product to be dispensed. For example, after the consumer has initiated a transaction and paid for network or Internet access or service, the consumer may decide or otherwise opt to select a product. The consumer may select the product via a user interface associated with the product dispenser, such as user interface 112.

In block 1206, a product is dispensed to the consumer. In the embodiment shown, a processor or controller, such as 106 in FIG. 1, associated with the product dispenser, such as 102A, can allow the consumer to dispense the selected product. For example, as long as the consumer is paying for network or Internet access or service, the consumer is allowed to dispense a product from the product dispenser, such as 102A.

Block 1206 is followed by decision block 1208, in which a determination is made as to whether the consumer is still using the Internet. If the determination is in the affirmative, that is, the consumer is still using or accessing the network or Internet, then the method 1200 continues at block 1210. If the determination is in the negative, that is, the consumer is not using or accessing the network or Internet, then the method 1200 continues at block 1212. In the embodiment shown, a processor or controller, such as 106 in FIG. 1, can determine whether the consumer is still using or accessing the network or Internet. For example, the controller, such as 106, can determine whether consumer is still using or accessing the network or Internet by obtaining information associated with the consumer's use of the network or Internet. The controller, such as 106, can determine whether predefined criteria are met, such as whether the consumer is logged in to the network or Internet. In one embodiment, a processor or controller, such as 106, can communicate with a local and/or remote server or data processing resource, such as 126, which can determine whether the consumer is still using or accessing the network or Internet. In any instance, a determination is made as to whether the consumer is still using the Internet or a network.

In block 1210, billing of the consumer for the network or Internet access is continued. In the embodiment shown, a processor or controller, such as 106, can continue billing the consumer if the consumer is still using or accessing the network or Internet.

Block 1210 is followed by decision block 1204, which is described above.

Referring to block 1212, the transaction ends. In the embodiment shown, a processor or controller, such as 106 in FIG. 1, associated with the product dispenser, such as 102A, can end the transaction if the consumer is not using or accessing the network or Internet. For example, billing of the consumer for network or Internet access can be terminated, and the consumer can no longer dispense a free or discounted product from the product dispenser, such as 102A.

The method 1200 ends after block 1212.

In one embodiment, in an Internet café location, a consumer can subscribe to Internet access. For a fee, the consumer can be allowed to use the Internet or other network at the location to check e-mail, surf the web, and/or for other purposes. During this time period, the consumer can be paying for Internet or other network access, the consumer can be allowed to dispense free or discounted products from the product dispenser.

Referring to FIG. 13, an example method 1300 of a using a product dispenser to pay for a product, such as a beverage. In the embodiment shown in FIG. 13, a commercial partner may elect to set up an account with a product or beverage provider, such that the commercial partner's employees, students, group members, or other members associated with the commercial partner can use a product dispenser and costs of any dispensed products or beverages can charged to the account associated with the commercial partner. For example, a commercial partner, such as United Parcel Service (UPS)™™, may elect to set up or establish a commercial partner account with a product provider, such that UPS employees can use particular product dispensers associated with the product provider, and the cost of any dispensed products can be charged to the commercial partner account associated with UPS. In this instance, UPS employees can obtain dispensed products from particular product dispensers associated with the product provider without having to pay for the products at the time of dispensing at the location of the product dispenser or otherwise on site associated with the product dispenser.

In another example, a particular product dispenser could be located in one or more McDonald's™ restaurants. UPS employees could utilize an identification technology, such as RFID, identification tokens and/or other similar devices to activate the product dispenser. In this instance, UPS employees could enter any McDonald's™ restaurants, identify himself or herself to the product dispenser, and dispense a product without having to pay for the product at the time of dispensing or otherwise on site at the location of dispensing. Payment for the dispensed product could then be charged to an account associated with UPS, such as a commercial partner account.

The method 1300 begins in block 1302. In block 1302, an identification device associated with a consumer or consumer's product cup is scanned or otherwise detected at or adjacent to a product dispenser. In this embodiment, identification information can be associated with a consumer, and the consumer can provide such information to a product dispenser. For example, a consumer can swipe a magnetic card or other device with identification information in a reader or other input/output device associated with a product dispenser, such as 102A in FIG. 1. In another embodiment, a cup or other container, such as 136, can include identification information, such as a RFID or other machine readable tag, such as 138, and a reader, such as a RFID or other machine readable code reader, such as 140, associated with a product dispenser, such as 102A, can receive the identification information.

Block 1302 is followed by decision block 1304, in which a determination is made as to whether a commercial partner account has been identified. If the determination is in the affirmative, that is, a commercial partner account has been identified then the method 1300 moves to block 1308. If the determination is in the negative, that is, a commercial partner account has not been identified then the method 1300 moves to decision block 1306. In the embodiment shown in FIG. 13, an identification scanner/reader device, such as 106A in FIG. 1, can be associated with a product dispenser, wherein the identification reader device is operable to receive or otherwise obtain identification information associated with a consumer or consumer's product cup. The identification scanner/reader device, 106A, can be in communication via a network, such as 104 or 204, with a server or data processing resource, such as 126 or 206, which can make a determination, based at least in part on the identification information, whether the consumer and/or consumer's product cup is associated with a commercial partner account. The server or data processing resource, such as 126 or 206, may communicate with one or more data storage devices, such as 128A-128C, to identify at least one commercial partner account.

In one embodiment, a consumer with a product cup having a RFID, or other identification device associated with the product cup, can manipulate the product cup in proximity to an identification reader device, such as 118A-118Q, associated with a product dispenser. Alternatively, a consumer can scan other identification devices, such as a RFID tag, token, card, PIN, and/or other ID form, as may be required and/or desired in a particular embodiment. Through the product dispenser, the identification reader device can data communicate locally or remotely with at least one server or data processing resource, such as 126 or 206, to determine if there is a commercial partner account associated with the consumer. Based at least in part on the determination, processing can move to either decision block 1306 or decision block 1308.

In decision block 1306, a notification is transmitted that a commercial partner account was not identified or otherwise determined. In the embodiment shown in FIG. 7, if a server or data processing resource, such as 126 or 206, determines that a commercial partner account associated with the consumer has not been established, or does not exist, then a corresponding instruction will be transmitted to the product dispenser preventing or otherwise limiting the consumer from dispensing a product unless a payment for the product is received. For example, in one embodiment, a notification can be transmitted to a client-type device associated with the product dispenser, the notification can inform the consumer and/or service personnel that a commercial partner account has not been established, or does not exist, and a payment is to be received from the consumer. After block 1306, the method 1300 ends.

In decision block 1308, a determination is made as to whether the account status is 'OK'. If the determination is in the affirmative, that is, the status of the account is 'OK', then the method 1300 continues to block 1310. If determination is in the negative, that is, the status of the account is not 'OK', then the method 1300 returns to block 1306. In the embodiment shown in FIG. 13, if a server or data processing resource, such as 126 or 206, determines that a commercial partner account associated with the consumer has not been suitably funded, or the account is not otherwise suitable for product reimbursement, then a corresponding instruction will be transmitted to the product dispenser preventing or otherwise limiting the consumer from dispensing a product unless a payment for the product is received.

Referring to block 1310, if a determination is made that the status of the account is 'OK', then a corresponding instruction will be transmitted to the product dispenser to permit the consumer to dispense a product.

Block 1310 is followed by block 1312, in which a balance associated with the account is adjusted or otherwise charged for the dispensed product. In the embodiment shown in FIG. 13, a server or data processing resource, such as 126 or 206, can monitor and adjust an account, such as a commercial partner account, for each product dispensed. In this manner, the account can be debited for each product dispensed.

The method 1300 ends after block 1312.

Referring to FIG. 14, an example method of using portion control for child size and sample size cup is illustrated. The method 1400 begins in block 1402. In block 1402, a consumer is allowed to place a cup in proximity to the product dispenser nozzle area. In this embodiment, a consumer can manipulate or otherwise place a cup in proximity to a nozzle associated with a product dispenser, such as nozzle 124 in FIG. 1.

Block 1402 is followed by block 1404, in which the cup is scanned. In this embodiment, a product dispenser, such as 102A in FIG. 1, can be configured to detect the presence of or otherwise receive information associated with the presence of the product or beverage cup. A product or beverage cup can include any number of wireless technologies including, but not limited to, a machine readable code, a bar code, RFID, radio frequency, infrared, or other wireless communication methods or devices as may be required and/or desired in a particular embodiment.

Block 1404 is followed by decision block 1406, in which a determination is made as to whether a child size cup has been scanned. If the determination is in the affirmative, that is, a child size cup has been scanned, then the method 1400 continues at block 1408. If the determination is in the negative, that is, the cup scanned is not a child size cup, then the method 1400 continues at decision block 1410. In the embodiment shown, a processor or controller, such as 106 in FIG. 1, can determine whether a child size cup has been scanned. For example, the controller, such as 106, can determine whether a child size cup has been scanned by obtaining information associated with the product cup, and determining whether predefined criteria are met, such as whether the product cup is a predefined size cup, such as a child size.

In block 1408, the product dispenser is set for child size portion control. In this embodiment, a processor or controller associated with a product dispenser, such as controller 106 in FIG. 1, can configure the dispenser for child size portion control. In one embodiment, the controller, such as 106, can limit the volume of the dispensed product to the amount suitable to fill a child size cup.

Block 1408 is followed by block 1414, which is described in greater detail below.

Referring to decision block 1410, a determination is made as to whether a sample size cup has been scanned. If the determination is in the affirmative, that is, a sample size cup has been scanned, then the method 1400 continues at block 1412. If the determination is in the negative, that is, the cup scanned is not a sample size cup, then the method 1400 continues at block 1414. In the embodiment shown, a processor or controller, such as 106 in FIG. 1, can determine whether a sample size cup has been scanned. For example, the controller, such as 106, can determine whether a sample size cup has been scanned by obtaining information associated with the product or beverage cup, and determining whether predefined criteria are met, such as whether the product or beverage cup is a predefined size cup, such as a sample size.

In block 1412, the product dispenser is set for sample size portion control. In this embodiment, a processor or controller associated with a product dispenser, such as controller 106 in FIG. 1, can configure the dispenser for sample size portion control. In one embodiment, the controller, such as 106, can limit the volume of dispensed product to the amount suitable to fill a sample size cup.

Block 1412 is followed by block 1414, in which the consumer is allowed to select a product. In the embodiment shown, a consumer can enter data via a user interface, such as 112 in FIG. 1, such as selection of an indicator corresponding to a product, such as DIET CHERRY COKE™. In other embodiments, other products can be selected by a consumer, or other data associated with one or more product selections can be entered by a consumer. In one embodiment, a product selection can be effectuated by way of a graphical user interface associated with a product dispenser, such as user interface 112.

Block 1414 is followed by block 1416, in which the consumer is allowed to dispense a product with portion control set for child size and sample size cups. In the embodiment shown, a processor or controller, such as 106 in FIG. 1, associated with the product dispenser, such as 102A, can allow the consumer to dispense a desired product with portion control set for a predefined size, such as a child size and/or sample size cups. In one embodiment, all other size cups, such as those for which portion control limits are not set, may receive other product amounts.

The method 1400 ends after block 1416.

In one embodiment, to avoid product spillage when child size and sample size cups are used, a product dispenser can utilize portion control. In this regard, when a child size or sample size cup is detected, the product dispenser can limit the portion volume of product dispensed. As such, a smaller volume of product can be dispensed minimizing the chances that the child size or sample size cup (being smaller in size) may overflow creating wastage of the beverage product. In one example, child size cups can be relatively small cups typically utilized by children. Sample size cups can be relatively small cups that are typically used by consumers to sample a small portion of a product, such as to see if they like it, prior to dispensing a relatively full cup of the product.

The capabilities of various embodiments of the invention can be implemented in software, firmware, hardware or some combination thereof.

As one example, one or more aspects of the invention can be included in an article of manufacture (e.g., one or more computer program products) having, for instance, computer usable media. The media has embodied therein, for instance, computer readable program code means for providing and facilitating the capabilities of the embodiment of the invention. The article of manufacture can be included as a part of a computer system or sold separately. One example of a suitable article of manufacture is a consumer interaction engine or module, such as 114 described in FIG. 1.

Additionally, at least one program storage device readable by a machine, tangibly embodying at least one program or set of instructions executable by the machine to perform the capabilities of the embodiment of the invention can be provided. One example of a suitable program storage device readable by machine is a memory or data storage device, such as 110 described in FIG. 1.

The flow diagrams depicted herein are examples. There may be many variations to these diagrams or the elements (or operations) described therein without departing from the scope of the claimed invention. For instance, the elements may be performed in a differing order, or elements may be added, deleted or modified. All of these variations are considered a part of the claimed invention.

While embodiments of the invention have been described, it will be understood that those skilled in the art, both now and in the future, may make various improvements and enhancements which fall within the scope of the claims which follow. These claims should be construed to maintain the proper protection for the invention first described.

The claimed invention is:

1. A product dispenser, comprising:
 a reader configured to read a machine readable item associated with a consumer; and a controller in communication with the reader, and configured to execute a set of instructions that, in response to execution, cause the controller to:
receive information from the machine readable item via the reader;
configure dispenser parameters of a product to be dispensed from the product dispenser based at least in part on the information from the machine readable item, the dispenser parameters comprising product formulation of the product and product size of the product;
provide a promotional offer to the consumer based at least in part on the product and a portion size of the product;
provide, prior to dispense of the product, an option via a user interface for the consumer to select an adjusted product associated with the promotional offer, wherein the adjusted product comprises an adjustment to one or more of the dispenser parameters based on the promotional offer; and
dispense the adjusted product in response to selection of the adjusted product.

2. The dispenser of claim 1, wherein the controller is further configured to execute a set of instructions that, in response to execution, cause the controller to further configure at least one of a product size of the product to be dispensed, or a product price of the product to be dispensed.

3. The dispenser of claim 1, wherein the machine readable item comprises at least one of product packaging, a print ad, a bar code, an icon, or a radiofrequency identification (RFID) tag.

4. The dispenser of claim 1, wherein the controller is further configured to execute a set of instructions that, in response to execution, cause the controller to determine whether the consumer is eligible to receive the product.

5. The dispenser of claim 1, wherein the product comprises at least one of a beverage, a beverage can, a beverage bottle, a beverage container, or a beverage refill.

6. A product dispenser, comprising:
a user interface configured to receive consumer input and output content to the consumer; and
a controller configured to execute a set of instructions that, in response to execution, cause the controller to:
receive product selection information from the consumer, the information identifies a selected product;
provide a promotional offer to the consumer based at least in part on the selected product and a portion size of the selected product;
provide, prior to dispense of the selected product, an option via the user interface for the consumer to select an adjusted product associated with the promotional offer, wherein the adjusted product comprises an adjustment to one or more dispenser parameters of the selected product based on the promotional offer, the one or more dispenser parameters comprising at least one of product formulation of the selected product or product size of the selected product; and
dispense the adjusted product.

7. The dispenser of claim 6, wherein the promotional offer comprises at least one of an offer for a phone card, an offer for a wireless communication device, an offer for Internet or network service, an offer for a particular type of product or service, or an offer for a specially priced product or service.

8. The dispenser of claim 6, wherein the product selection information from a consumer comprises information provided to the dispenser by at least one of a user interface associated with the product dispenser, a machine readable code, product packaging, a print ad, a bar code, an icon, information from an RFID tag, a communication from a client-type device, or a communication from a wireless communication device.

9. The dispenser of claim 6, wherein promotional information can be provided via the user interface to present a promotional offer associated with the product or a different product.

10. The dispenser of claim 6, wherein the controller is further configured to execute a set of instructions that, in response to execution, cause the controller to bill the consumer for use of the product or service.

11. A method for product dispensing, comprising:
receiving information from a machine readable item associated with a consumer;
configuring dispenser parameters of a product to be dispensed from a product dispenser based at least in part on the information from the machine readable item, the dispenser parameters comprising product formulation and product size;
providing a promotional offer, based at least in part on the product and a portion size of the product, to the consumer;
prior to dispensing any product, providing an option via a user interface for the consumer to select an adjusted product associated with the promotional offer, wherein the adjusted product comprises an adjustment to one or more dispenser parameters of the selected product based on the promotional offer; and
dispensing the adjusted product.

12. The method of claim 11, further comprising configuring at least one of a product size of the product to be dispensed or a product price of the product to be dispensed.

13. The method of claim 11, wherein the machine readable item comprises at least one of product packaging, a print ad, a bar code, an icon, or an RFID tag.

14. The method of claim 11, wherein dispensing the adjusted product comprises determining whether the consumer is eligible to receive the product.

15. The method of claim 11, wherein the product comprises at least one of a beverage, a beverage can, a beverage bottle, a beverage container, or a beverage refill.

16. A method for operating a product dispenser, comprising:
receiving product selection information from a consumer, the information identifies a selected product;
providing a promotional offer to the consumer based at least in part on the selected product and a portion size of the selected product;
prior to dispensing the product, providing an option via a user interface for the consumer to select an adjusted product associated with the promotional offer, wherein the adjusted product comprises an adjustment to one or more dispenser parameters of the selected product based on the promotional offer, the one or more dispenser parameters comprising at least one of product formulation of the selected product or product size of the selected product; and
dispensing the adjusted product corresponding to the promotional offer.

17. The method of claim 16, wherein the promotional information comprises at least one of an offer for a phone card, an offer for a wireless communication device, an offer for Internet or network service, an offer for a particular type of product or service, or an offer for a specially priced product or service.

18. The method of claim 16, wherein receiving the product selection information from the consumer comprises obtaining information from at least one of a user interface associated with the product dispenser, a machine readable code, product packaging, a print ad, a bar code, an icon, information from an RFID tag, a communication from a client-type device, or a communication from a wireless communication device.

19. The method of claim 16, wherein providing promotional information to the consumer based at least in part on the product selection information comprises configuring a user interface to present a promotional offer associated with the product or a different product.

20. The method of claim 16, further comprising billing the consumer for use of the product or service.

21. A method for operating a product dispenser, comprising:
   receiving information associated with a consumer;
   based at least in part on the information associated with the consumer, identifying whether a commercial partner associated with the consumer exists; and
   dispensing a product in accordance with the determination whether a commercial partner exists.

22. The method of claim 21, wherein receiving information associated with a consumer comprises reading cup identification information using at least one of an RFID reader, a bar code scanner, a wireless communication device, or an optical communication device.

23. The method of claim 21, further comprising billing the commercial partner for a dispensed product.

* * * * *